United States Patent
Chilimbi et al.

(10) Patent No.: US 10,686,869 B2
(45) Date of Patent: Jun. 16, 2020

(54) TOOL FOR INVESTIGATING THE PERFORMANCE OF A DISTRIBUTED PROCESSING SYSTEM

(71) Applicant: Microsoft Corporation, Redmond, WA (US)

(72) Inventors: Trishul Chilimbi, Seattle, WA (US); Yutaka Suzue, Issaquah, WA (US); Johnson T. Apacible, Mercer Island, WA (US); Karthik Kalyanaraman, Redmond, WA (US); Olatunji Ruwase, Bellevue, WA (US); Yuxiong He, Bellevue, WA (US); Feng Yan, Williamsburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1412 days.

(21) Appl. No.: 14/500,222

(22) Filed: Sep. 29, 2014

(65) Prior Publication Data

US 2016/0092765 A1   Mar. 31, 2016

(51) Int. Cl.
*H04L 29/08* (2006.01)
*G06N 3/08* (2006.01)
*G06N 3/04* (2006.01)

(52) U.S. Cl.
CPC .......... *H04L 67/10* (2013.01); *G06N 3/0454* (2013.01); *G06N 3/084* (2013.01)

(58) Field of Classification Search
CPC .................................. G06N 3/08; G06N 3/10
See application file for complete search history.

(56) References Cited

U.S. PATENT DOCUMENTS

| | | | |
|---|---|---|---|
| 2002/0023260 A1* | 2/2002 | Isman | G06F 11/323 717/127 |
| 2013/0212052 A1 | 8/2013 | Yu et al. | |
| 2014/0067738 A1* | 3/2014 | Kingsbury | G06N 3/08 706/20 |
| 2014/0115592 A1* | 4/2014 | Frean | G06F 9/5027 718/102 |

(Continued)

OTHER PUBLICATIONS

Large Scale Distributed Deep Networks, by Dean et al., published 2012.*

(Continued)

*Primary Examiner* — Eric Nilsson
(74) *Attorney, Agent, or Firm* — Rainier Patents, P.S.

(57) ABSTRACT

A performance investigation tool (PIT) is described herein for investigating the performance of a distributed processing system (DPS). The PIT operates by first receiving input information that describes a graph processing task to be executed using a plurality of computing units. The PIT then determines, based on the input information, at least one time-based performance measure that describes the performance of a DPS that is capable of performing the graphical task. More specifically, the PIT can operate in a manual mode to explore the behavior of a specified DPS, or in an automatic mode to find an optimal DPS from within a search space of candidate DPSs. A configuration system may then be used to construct a selected DPS, using the plurality of computing units. In one case, the graph processing task involves training a deep neural network model having a plurality of layers.

20 Claims, 18 Drawing Sheets

(56) References Cited

U.S. PATENT DOCUMENTS

2015/0324690 A1* 11/2015 Chilimbi ............... G06N 3/063
706/25

OTHER PUBLICATIONS

Analysis of Benchmark Characteristics and Benchmark Performance Prediction, by Saavedra , published 1996.*
One weird trick for paralelizing convolutional neural networks, by Krizhevsky, published Apr. 2014.*
Performance Analysis of Cloud Computing Services for Many-Tasks Scientific Computing, by Iosup, published 2010.*
"Stratix V Device Handbook," available at <<http://www.altera.com/literature/hb/stratix-v/stratix5_handbook.pdf>>, Altera Corporation, San Jose, CA, Jul. 2014, 544 pages.
Bengio, Yoshua, "Learning Deep Architectures for AI," Foundations and Trends in Machine Learning, vol. 2, No. 1, 2009, 130 pages.
Bottou, Léon, "Large-scale Machine Learning with Stochastic Gradient Descent," in Proceedings of the 19th International Conference on Computational Statistics, COMPSTAT'2010, 2010, 10 pages.
Chakradhar, et al., "A Dynamically Configurable Coprocessor for Convolutional Neural Networks," in Proceedings of the 37th Annual International Symposium on Computer Architecture, 2010, 11 pages.
Chen, et al., "DianNao: A Small-Footprint High-Throughput Accelerator for Ubiquitous Machine-learning," in Proceedings of the 19th International Conference on Architectural Support for Programming Languages and Operating Systems, Mar. 2014, 15 pages.
Cipar, et al., "Solving the Straggler Problem with Bounded Staleness," in Proceedings of the 14th USENIX Conference on Hot Topics in Operating Systems, May 2013, 6 pages.
Ciresan, et al., "Deep Big Simple Neural Nets Excel on Handwritten Digit Recognition," available at <<Deep Big Simple Neural Nets Excel on Handwritten Digit Recognition>>, arXiv reprints, arXiv:1003.0358v1 [cs.NE], 2010, 14 pages.
Coates, et al., "Deep learning with COTS HPC systems," in Proceedings of the 30th International Conference on Machine Learning, Jun. 2013, 9 pages.
Coates, et al., "An Analysis of Single-Layer Networks in Unsupervised Feature Learning," in Proceedings of 14th International Conference on Artificial Intelligence and Statistics, 2011, 9 pages.
Culler, et al., "LogP: Towards a Realistic Model of Parallel Computation," in Proceedings of the Fourth ACM SIGPLAN Symposium on Principles and Practice of Parallel Programming, 1993, 12 pages.
Dahl, et al., "Context-Dependent Pre-trained Deep Neural Networks for Large-vocabulary Speech Recognition," in IEEE Transactions on Audio, Speech, and Language Processing, vol. 20, No. 1, Jan. 2012, 13 pages.
Dean, et al., "Large Scale Distributed Deep Networks," in Proceedings of the Neural Information Processing Systems Foundation (NIPS), 2012, 9 pages.
Deng, et al., "ImageNet: A Large-Scale Hierarchical Image Database," in Proceedings of the Conference on Computer Vision and Pattern Recognition, 2009, 8 pages.
Dragojevi'c, et al., "FaRM: Fast Remote Memory," in Proceedings of the 11th USENIX Symposium on Networked Systems Design and Implementation, Apr. 2014, 15 pages.
Farabet, et al., "Hardware Accelerated Convolutional Neural Networks for Synthetic Vision Systems," in Proceedings of the International Symposium on Circuits and Systems (ISCAS), 2010, 4 pages.
Farabet, et al., "CNP: An FPGA-Based Processor for Convolutional Networks," in Proceedings of the International Conference on Field Programmable Logic and Applications (FLP), 2009, 6 pages.
Hinton, et al., "Deep Neural Networks for Acoustic Modeling in Speech Recognition," in Signal Processing Magazine, 2012, 27 pages.
Ho, et al., "More Effective Distributed ML via a Stale Synchronous Parallel Parameter Server," in Proceedings of the Neural Information Processing Systems Foundation (NIPS), Dec. 2013, 9 pages.
Hubel, et al., "Receptive Fields of Single Neurones in the Cat's Striate Cortex," in Journal of Physiology, No. 148, 1959, 18 pages.
Jacques-Silva, et al., "Modeling Stream Processing Applications for Dependability Evaluation," in Proceedings of the 2011 IEEE/IFIP 41st International Conference on Dependable Systems & Networks, 2011, 12 pages.
Jogalekar, et al., "Evaluating the Scalability of Distributed Systems," in IEEE Transactions on Parallel and Distributed Systems, vol. 11, Issue 6, Jun. 2000, 15 pages.
Krizhevsky, et al., "ImageNet Classification with Deep Convolutional Neural Networks," in Proceedings of the Neural Information Processing Systems Foundation (NIPS), 2012, 9 pages.
Lama, et al., "AROMA: Automated Resource Allocation and Configuration of MapReduce Environment in the Cloud," in Proceedings of the 9th International Conference on Autonomic Computing, 2012, 10 pages.
Le, et al., "Building High-level Features Using Large Scale Unsupervised Learning," available at <<http://arxiv.org/pdf/1112.6209.pdf%3Cbr/%3E>>, arXiv reprints, arXiv:1112.6209v5 [cs.LG], Jul. 2012, 11 pages.
Niu, et al., "Hogwild!: A Lock-Free Approach to Parallelizing Stochastic Gradient Descent," in Proceedings of the Neural Information Processing Systems Foundation (NIPS), 2011, 9 pages.
Putnam, et al., "A Reconfigurable Fabric for Accelerating Large-Scale Datacenter Services," in Proceedings of the 41st Annual International Symposium on Computer Architecture (ISCA), Jun. 2014, 12 pages.
Raina, et al., "Large-scale Deep Unsupervised Learning Using Graphics Processors," in Proceedings of the 26th Annual International Conference on Machine Learning, 2009, 8 pages.
Siddiqui, et al., "Grid Capacity Planning with Negotiation-based Advance Reservation for Optimized QOS," in Proceedings of the 2006 ACM/IEEE Conference on Supercomputing, 2006, 16 pages.
Singh, et la., "A Provisioning Model and its Comparison with Best-Effort for Performance Cost Optimization in Grids," in Proceedings of the 16th International Symposium on High Performance Distributed Computing, 2007, 10 pages.
Verma, et al., "ARIA: Automatic Resource Inference and Allocation for MapReduce Environments," in Proceedings of the 8th ACM International Conference on Autonomic Computing, 2011, 10 pages.
Zeiler, et al., "Visualizing and Understanding Convolutional Neural Networks," available at <<http://anrxiv.org/abs/1311.2901>>, arXiv preprint Xiv:1311.2901 [cs.CV], Nov. 2013, 11 pages.
Zhao, et la., "A Unified Modeling Framework for Distributed Resource Allocation of General Fork and Join Processing Networks," in Proceedings of the ACM SIGMETRICS International Conference on Measurement and Modeling of Computer Systems, 2010, 12 pages.
Alizadeh, et al., "Data Center TCP (DCTCP)," in Proceedings of the ACM SIGCOMM 2010 Conference, 2010, 12 pages.
Vasudevan, et al., "Safe and Effective Fine-Grained TCP Retransmissions for Datacenter Communication," in Proceedings of the AcCM SIGCOMM 2009 Conference on Data Communication, 2009, 12 pages.
Zaharia, et al., "Improving MapReduce Performance in Heterogeneous Environments," in Proceedings of the 8th USENIX Symposium on Operating Systems Design and Implementation, 2008, 14 pages.
Zhang, et al., "Large-Scale Deep Belief Nets with MapReduce," in IEEE Access, vol. 2, Apr. 2014, 14 pages.
Deng, et al., "Deep Convex Net: A Scalable Architecture for Speech Pattern Classification," in Proceedings of the 12th Annual Conference of the International Speech Communication Association, 2011, 4 pages.
Chen, et al., "Distributed Neural Networks with GPUs in the AWS Cloud," available at <<http://techblog.netflix.com/2014/02/distributed-neural-networks-with-gpus.html>>, The NetFlix Tech Blog, Feb. 10, 2014, 6 pages.
Vinyals, Oriol, "Beyond Deep Learning: Scalable Methods and Models for Learning," available at <<http://www.eecs.berkeley.edu/

(56) References Cited

OTHER PUBLICATIONS

Pubs/TechRpts/2013/EECS-2013-202.html>>, in Technical Report No. UCB/EECS-2013-202, Dept. of Electrical Engineering and Computer Sciences, University of California at Berkeley, Dec. 12, 2013, 108 pages.

Yan, et al., "A Scalable Approach to Using DNN-Derived Features in GMM-HMM Based Acoustic Modeling for LVCSR," in Proceedings of the 14th Annual Conference of the International Speech Communication Association, Aug. 2013, 5 pages.

Yu, et al., "Accelerated Parallelizable Neural Network Learning Algorithm for Speech Recognition," in Proceedings of the 12th Annual Conference of the International Speech Communication Association, 2011, 4 pages.

Denil, et al., "Predicting Parameters in Deep Learning," in Proceedings of the 27th Annual Conference on Neural Information Processing Systems, Dec. 5, 2013, 9 pages.

Agarwal et al., "Distributed Delayed Stochastic Optimization", Proceedings of Neural Information Processing Systems, Dec. 12-17, 2011, 9 pages.

Babu, Shivnath, "Towards Automatic Optimization of MapReduce Programs", Proceedings of the 1st ACM Symposium on Cloud Computing, Jun. 10-11, 2010, Indianapolis, IN, 6 pages.

Collobert et al., "Natural Language Processing (Almost) from Scratch", Journal of Machine Learning Research, Aug. 2011, pp. 2493-2537, 45 pages.

Dauphin et al., "Identifying and attacking the saddle point problem in high-dimensional non-convex optimization", Proceedings of Neural Information Processing Systems, Dec. 8-13, 2014, 9 pages.

Huang et al., "Learning Deep Structured Semantic Models for Web Search using Clickthrough Data", Proceedings of the 22nd ACM International Conference on Information & Knowledge Management, Oct. 27-Nov. 1, 2013, San Francisco, CA, 8 pages.

Lecun et al., "Gradient-Based Learning Applied to Document Recognition", Proceedings of the IEEE, vol. 86, No. 11, Nov. 1998, 46 pages.

Li et al., "Stochastic Modeling of Large-Scale Solid-State Storage Systems: Analysis, Design Tradeoffs and Optimization", Proceedings of the ACM SIGMETRICS International Conference on Measurement and Modeling of Computer Systems, Jun. 17-21, 2013, Pittsburgh, PA, 12 pages.

Mcdonald et al., "Distributed Training Strategies for the Structured Perceptron", Proceedings of Human Language Technologies: 2010 Annual Conference of the North American Chapter of the Association for Computational Linguistics, Jun. 2010, Los Angeles, CA, pp. 456-464, 9 pages.

Mcdonald et al., "Efficient Large-Scale Distributed Training of Conditional Maximum Entropy Models", Proceedings of Advances in Neural Information Processing Systems, Dec. 2009, 9 pages.

Yan et al., "Performance Modeling and Scalability Optimization of Distributed Deep Learning Systems", Proceedings of the 21th ACM International Conference on Knowledge Discovery and Data Mining, Aug. 10-13, 2015, Sydney, NSW, Australia, 10 pages.

Mandic et al., "Recurrent Neural Networks for Prediction: Learning Algorithms, Architectures and Stability," John Wiley & Sons, Inc., New York, NY, USA, 2001, 285 pages.

Dean, Jeffrey and Sanjay Ghemawat, "MapReduce: Simplified Data Processing on Large Clusters," OSDI '04, Oct. 3, 2004, 12 pages.

Yan et al., "Performance Modeling and Scalability Optimization of Distributed Deep Learning Systems", published Mar. 18, 2015, retrieved at <<http://www.cs.wm.edu/~fyan/TechReport.pdf>> on Jun. 9, 2015, 13 pages.

Chilimbi et al., "Project Adam: Building an Efficient and Scalable Deep Learning Training System," OSDI, Oct. 6, 2014, vol. 14, pp. 571-582, 13 pages.

Saxe et al., "Dynamics of Learning in Deep Linear Neural Networks," NIPS Workshop on Deep Learning, Dec. 9, 2013, 9 pages.

* cited by examiner

LAYER = $z_2$

LAYER REPLICA = $r_R$

606

⋮

LAYER REPLICA = $r_2$

PARTITION = $p_1$    PARTITION = $p_E$

THREAD = $m_M$  □ □ □ ⋯   ⋯ □ □ □

⋮   ⋮   ($z_2, p_1, m_2, r_2$)   ⋮

THREAD = $m_2$  □ □ □ ⋯   ⋯ □ □ □

⋯

THREAD = $m_1$  □ □ □ ⋯   ⋯ □ □ □

402       404

604

LAYER REPLICA = $r_1$

TOOL FOR INVESTIGATING THE PERFORMANCE OF A DISTRIBUTED PROCESSING SYSTEM

BACKGROUND

Deep Neural Networks (DNNs) have recently been produced which offer output results having state-of-the-art levels of accuracy. For example, DNNs have provided impressive results when applied to the interpretation of audio information, image information, text information, etc. A DNN is composed of multiple layers, where each layer, z, includes multiple neurons. Each neuron, in turn, provides an output result (referred to as an output activation) that is computed as a function of inputs provided by the neurons in a preceding layer, (z−1). A DNN model collectively refers to all of the parameters (e.g., weighting and biasing values) that are used to compute the activations.

A training system produces a DNN model based on a corpus of labeled input data, such as a corpus of images having labels that identify the objects in the images. In one case, the training system may produce the DNN model using a gradient descent technique, which entails successive forward and back propagation phases of analysis. Such a training task typically involves the processing of a large number of input examples (e.g., corresponding to terabytes of data), and learning a very large number of parameters (e.g., corresponding to billions of parameter values). Hence, the task of training a DNN can be expected to consume an enormous amount of computing resources, and can take a considerable about of time to perform.

The research community has proposed various distributed processing systems to train DNNs in an expedited manner. A distributed processing system is composed of a cluster of computing units which train the DNN in a parallel manner, e.g., by breaking the training task into sub-tasks and performing the sub-tasks in parallel.

More generally stated, the operation of training a DNN model using a distributed processing system is an example of a graph processing task. In the case of a DNN, the neurons of the DNN model constitute nodes within a graph, and the connections between the neurons constitute the links of the graph. Other distributed graph processing tasks, that is, other than the task of training a DNN model, are also resource-intensive in nature.

SUMMARY

A computer-implemented performance investigation tool (PIT) is described herein for investigating the performance of a distributed processing system (DPS), prior to actually deploying the DPS. In one implementation, the PIT operates by first receiving input information that describes at least some characteristics of a graph processing task to be executed in a distributed manner by a plurality of computing units. The PIT then determines, based on the input information, at least one time-based performance measure that describes the performance of at least one DPS that is capable of performing the graph processing task. Upon determination that the time-based performance measure(s) are acceptable, a configuration system may be used to construct the DPS using the plurality of computing units. According to one case, the graph processing task involves the training of a deep neural network model using the DPS.

More specifically, in a manual mode of operation, a developer may provide input information that describes a particular DPS. The PIT can then generate at least one time-based performance measure which describes the amount of time that it will take the particular DPS to perform the graph processing task. In an automated mode of operation, the PIT may automatically determine an optimal DPS, selected from a search space of candidate DPSs.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4-7 show different dimensions along which a distributed processing system may perform processing work in a distributed fashion.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for assessing the performance of a distributed processing system, as applied to a graph processing task. Section B sets forth illustrative methods which explain the operation of the functionality of Section A. Section C describes illustrative computing functionality that can be used to implement any aspect of the features described in Sections A and B.

Figure 20:
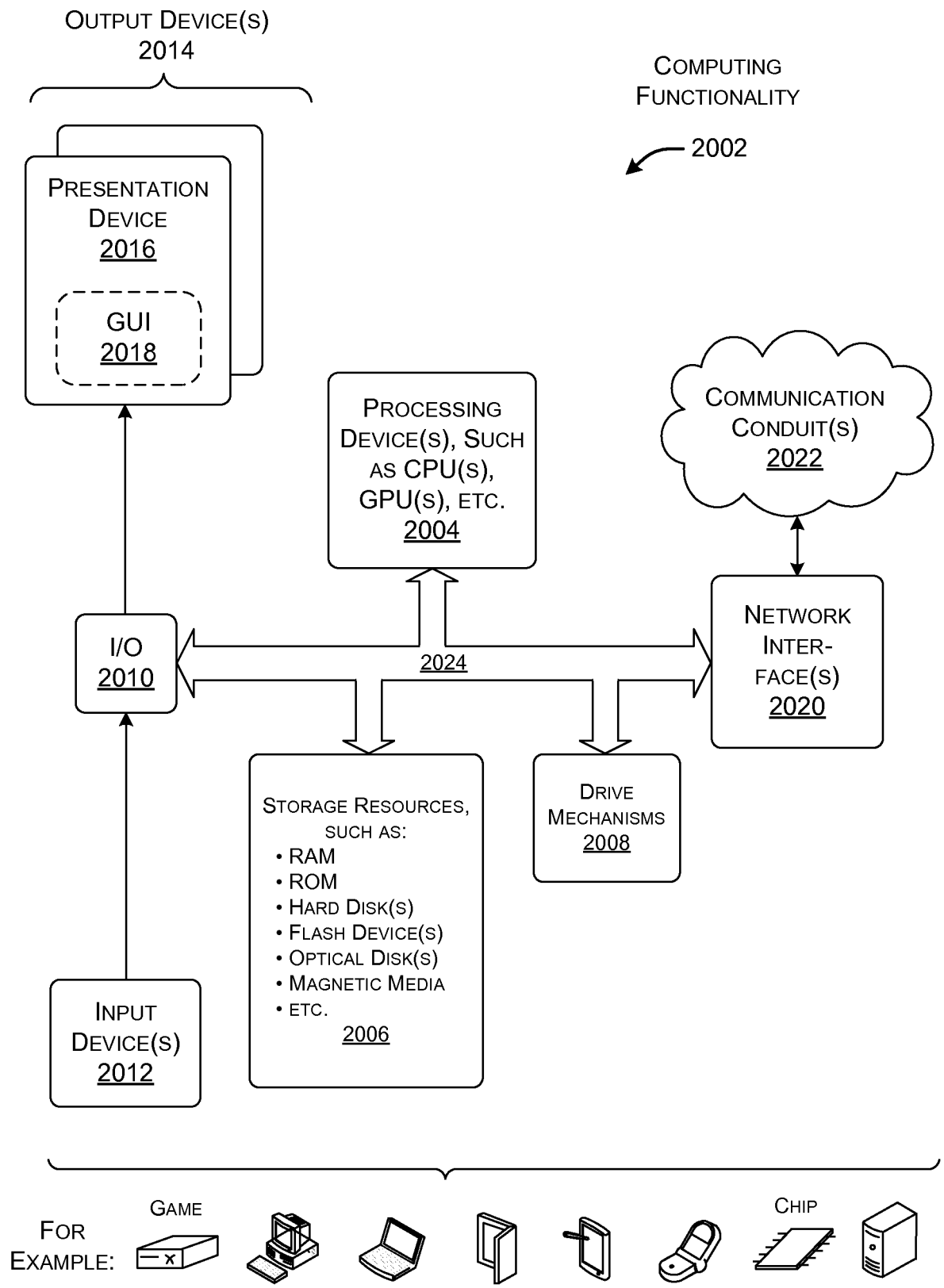
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, in whatever manner implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Functionality

A.1. Overview of the Framework

Figure 1:
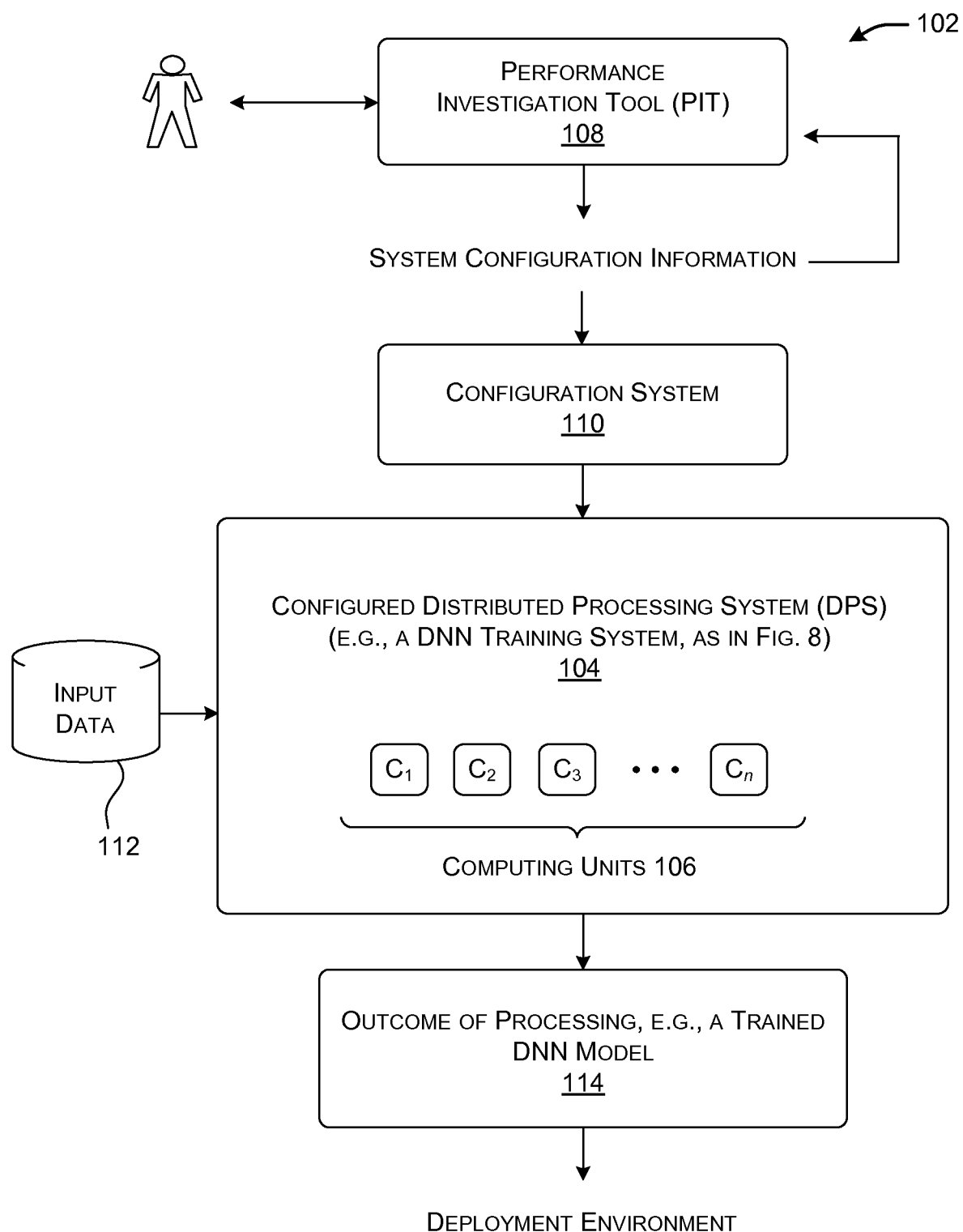
FIG. 1 shows an overview of a framework which investigates the prospective performance of a distributed processing system (DPS), which operates on a graphical model. The model, for instance, may correspond to a Deep Neural Network (DNN) model.

FIG. 1 shows an overview of a framework 102 that may be used to investigate the performance of at least one distributed processing system (DPS), such as a DPS 104. The DPS 104, when deployed, performs a graph processing task. The framework 102 also includes functionality for building the DPS 104 and then using the DPS 104 to perform the graph processing task.

As the term is used herein, a distributed processing system (DPS) refers to any system that uses a collection of computing units 106 to perform a computing task. The computing units 106 operate in parallel to expedite the graph processing task. Further, each given DPS under consideration embodies a resource allocation architecture which describes the selection, organization, and configuration of the computing units 106 in the DPS. For example, as will be described below, one resource allocation architecture organizes the computing units 106 into a collection of replica units and worker units.

A computing unit refers to any type of processing resource. In one case, a single computing unit may correspond to a computing device of any type, such as a server computing machine of any type. That single computing unit, in turn, may include plural processing cores, e.g., plural central processing units (CPUs) and/or plural graphics processing units (GPUs), etc. Further, any single computing unit (and any processing core) may perform operations using one or more threads. In another implementation, a single computing unit may correspond to a dedicated hardware logic component, e.g., corresponding to a processing element in a collection of such elements provided by an Application Specific Integrated Circuit (ASIC). The above examples of computing units are cited in the spirit of illustration, not limitation; other implementations can use addition types of computing units.

In one implementation, the collection of computing units 106 represent homogenous devices, such as a collection of server computing devices of the same type. In another implementation, the computing units 106 may represent a collection of different types of computing devices. However, to facilitate and simplify the following explanation, it will henceforth be assumed that the DPS 104 is constructed from a collection of computing devices of the same type, and those computing devices are dedicated to the graph processing task.

A graph processing task refers to some computation that is performed on, or which is otherwise based on, a graphical model. A graphical model, in turn, refers to any data structure that may be conceptualized as a plurality of nodes and a plurality of links. Each link establishes a relationship between at least two nodes which it connects together.

The following description will describe a principal example in which the graph processing task corresponds to the task of training a Deep Neural Network (DNN) model. A DNN model includes a plurality of layers. Each layer includes a plurality of neurons. The neurons in any given layer are coupled to all or some of the neurons in a preceding layer (if any), and to all or some of the neurons in a subsequent layer (if any). The terms "preceding" and "subsequent" are defined in terms of the flow of computation in the DNN model; that is, a preceding layer, with respect to a given layer, is that layer from which the given layer receives its input signals, while a subsequent layer is the layer to which the given layer provides its output signals. Expressed in the generic terminology of a graphical model, the neurons in the DNN model constitute nodes, while the connections between the nodes represent links. Subsection A.2 (below) provides additional information regarding the construction and operation of one type of DNN model.

However, note that the framework 102 can also be applied to other graph processing tasks. For example, in another case, a graph processing task may consist of finding an optimal path through a map. In that context, the graphical model that is acted on describes locations on a map, together with paths between the locations. That is, the locations correspond to nodes and the paths correspond to links that connect the nodes together. In another case, a graph processing task involves finding a group of individuals who have a specified relationship with a particular person. In that context, the graphical model that is acted on describes individuals, together with relationships among the individuals. That is, the individuals correspond to nodes in the graph, while their relationships correspond to links. Still other such applications are possible.

Now referring to the particular flow of operation shown in FIG. 1, to begin with, a performance investigation tool (PIT) 108 investigates the prospective performance of at least one candidate DPS. As used herein, a candidate DPS refers to a distributed processing system under consideration.

More specifically, the PIT 108 can operate in at least two modes: a manual mode and an automated mode. In the manual model, a user may manually provide input information which describes the salient characteristics of at least one particular candidate DPS. For example, the user may provide input information which fully describes the resource allocation architecture of the particular candidate DPS. The PIT 108 then generates output information which describes the performance of the particular candidate DPS.

In the automated mode of operation, the user provides input information which describes one or more constraints that a desired DPS is expected to satisfy, but without otherwise specifying the full resource allocation architecture of the DPS. The PIT 108 then automatically selects one or more good-performing DPSs out of a collection of possible candidate DPSs that meet the specified constraint(s). For example, the PIT 108 may select the best (optimal) DPS from within a search space of possible DPS solutions. The PIT 108 can then generate output information which describes the performance of the selected DPS.

More specifically, the PIT 108 estimates the performance of any candidate DPS by generating and delivering one or more time-based performance measures. For example, the PIT 108 may estimate the total amount of time that a candidate DPS will take to train a DNN model. (For particularly large DNN models, it would not be uncommon for this training time to extend several hours, days, or longer.) Further, the PIT 108 can provide insight regarding the amounts of time that are consumed by individual subprocesses within a training operation.

A model developer can use the PIT 108 to receive a forecast regarding the amount of time (and computing resources) that will be consumed by a candidate DPS in the course of training the DNN. The forecast informs the developer as to when the training will likely terminate. In some cases, the forecast also provides insight into possible bottlenecks in the training process, and the causes of those bottlenecks. The developer may respond to this analysis by redesigning one or more aspects of a DPS (and/or the DNN model) under consideration to remedy the identified problems. For example, the developer can alter any aspect of the resource allocation architecture of the DPS. The developer may then use the PIT 108 to investigate the time-based performance of the modified DPS design, e.g., using either the manual mode or the automated mode, or a combination of both.

Assume that the model developer eventually approves a candidate DPS after reviewing the above-described time-based performance measures. That selected candidate DPS corresponds to the DPS 104 depicted in FIG. 1. The PIT 108 provides system configuration information which describes the characteristics of the selected DPS 104, such as its resource allocation architecture, the types of computing units to be used in the DPS, and so on.

A configuration system 110 performs the task of building the chosen DPS 104 based on the system configuration information provided by the PIT 108. In one case, the configuration system 110 builds the DPS 104 by loading or activating appropriate code modules hosted by the computing units 106. The code modules allow the computing units 106 to perform their respective assigned tasks within the resource allocation architecture of the DPS 104. The configuration system 110 can also establish communication channels for use in communicating information among the different computing units 106 during the training operation, and between the computing units 106 and one or more parameter modules (to be described below).

In a training phase stage, the DPS 104 performs the actual training operation. In doing so, the DPS 104 operates on a corpus of training data provided in a data store 112. The training data may correspond to a plurality of labeled samples. For example, in an image processing application, each sample may correspond to an image together with some type of classification of the image's content.

The outcome of the training, in the above case, corresponds to a trained DNN model 114. Although not shown in FIG. 1, a developer may validate the DNN model 114 using known techniques, such as by analyzing the accuracy of the DNN model 114 with respect to a corpus of hold-out data. The developer may choose to retrain the DNN model 114 in whole or in part if the DNN model 114 performs poorly in interpreting the examples in the hold-out data set.

Once trained, the developer may then deploy the DNN model 114 in its intended environment. That is, in a text processing example, the developer may deploy the DNN model 114 in a search engine. In an audio processing example, the developer may deploy the DNN model 114 in a speech recognition system. In an image processing example, the developer may deploy the DNN model 114 in an image detection engine, and so on.

Figure 2:
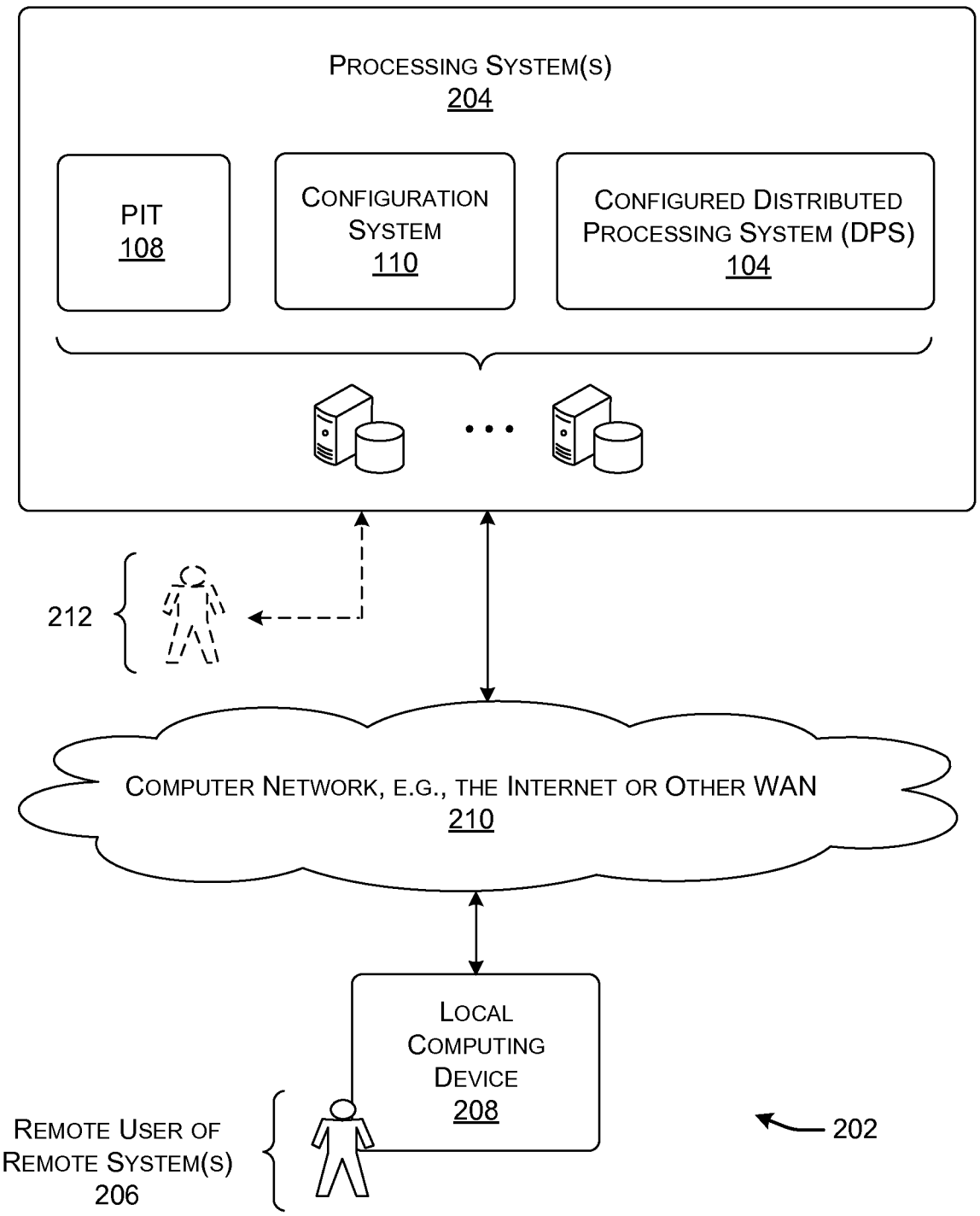
FIG. 2 shows one type of computing system that may be used to implement the framework of FIG. 1.

FIG. 2 shows one type of computing system 202 that may be used to implement the framework 102 of FIG. 1, or parts thereof. For example, the computing system 202 may provide a processing system 204 that is composed of one or more computer servers, one or more data stores, and/or other computing equipment. The resources of the processing system 204 may be provided at a single site or may be distributed over plural sites. Further, the processing system 204 may be administered by a single entity or plural entities.

FIG. 2 specifically indicates that the processing system 204 may implement the PIT 108, the configuration system 110, and the distributed processing system (DPS) 104. To repeat, the PIT 108 estimates the time-based performance of one or more candidate DPSs. The configuration system 110 builds the DPS 104, once a decision has been made that the DPS's performance is acceptable. The task of building the DPS 104 may involve allocating appropriate code to computing units, connecting the computing units together in a specified manner, and so on. The DPS 104 itself corresponds to the collection of computing units 106 that have been configured by the configuration system 110. The computing units 106 within the DPS 104 may communicate with each other via any local area network (not shown), and via any protocol (e.g., via Ethernet connections).

A remote user 206 may interact with any aspect of the processing system 204 using a local computing device 208, via a computer network 210. The local computing device 208 may correspond to any type of user device, such as a stationary personal computing device, a game console, a set-top box device, a smartphone, a tablet-type computing device, and so on. The computer network 210 may correspond to a wide area network (e.g., the Internet), a local area network, one or more point-to-point links, and so on.

In another use scenario, the processing system 204 may instead represent the resources associated with some local system, which is available to a local user 212. For example, the local system may correspond to a cluster of computing devices provided by an organization, and the local user 212 may correspond to a member of that organization who has access to the local system. In that case, the local user 212 may directly interact with the components of the processing system 204.

In yet other implementations, some aspects of the framework 102 of FIG. 1 may be remotely located with respect to a user, while other aspects may be local.

In conclusion to this introductory subsection, the framework 102 of FIG. 1 may provide one or more technical advantages. First, the framework 102 allows a developer to efficiently find an acceptable DPS solution in advance of deploying the solution. This characteristic reduces or eliminates the waste of computing resources that may occur upon deploying an under-performing DPS. This characteristic also reduces the time that is involved in finding an acceptable DPS solution, e.g., by reducing or eliminating the need for successive ad hoc "in-field" testing of DPS solutions. Indeed, in the automated mode of operation, the framework 102 can immediately identify a DPS solution that is assured as offering the best performance.

Second, the framework 102 may provide guidance that allows a developer to improve a DPS design, especially in those cases in which a current DPS solution suffers from one or more bottlenecks. In previous solutions, a developer may have no insight as to the underlying causes which explain why a DPS solution is exhibiting poor performance.

Third, a DPS that is resource-efficient in nature allows the developer to produce a robust and accurate DNN model. In particular, an efficient DPS may enable the developer to increase the number of training samples that are processed in the training operation, and/or to increase the number of layers and/or neurons in the DNN model. These factors may contribute to the production of an accurate DNN model.

A.2. Deep Neural Network Models (DNNs)

Figure 3:
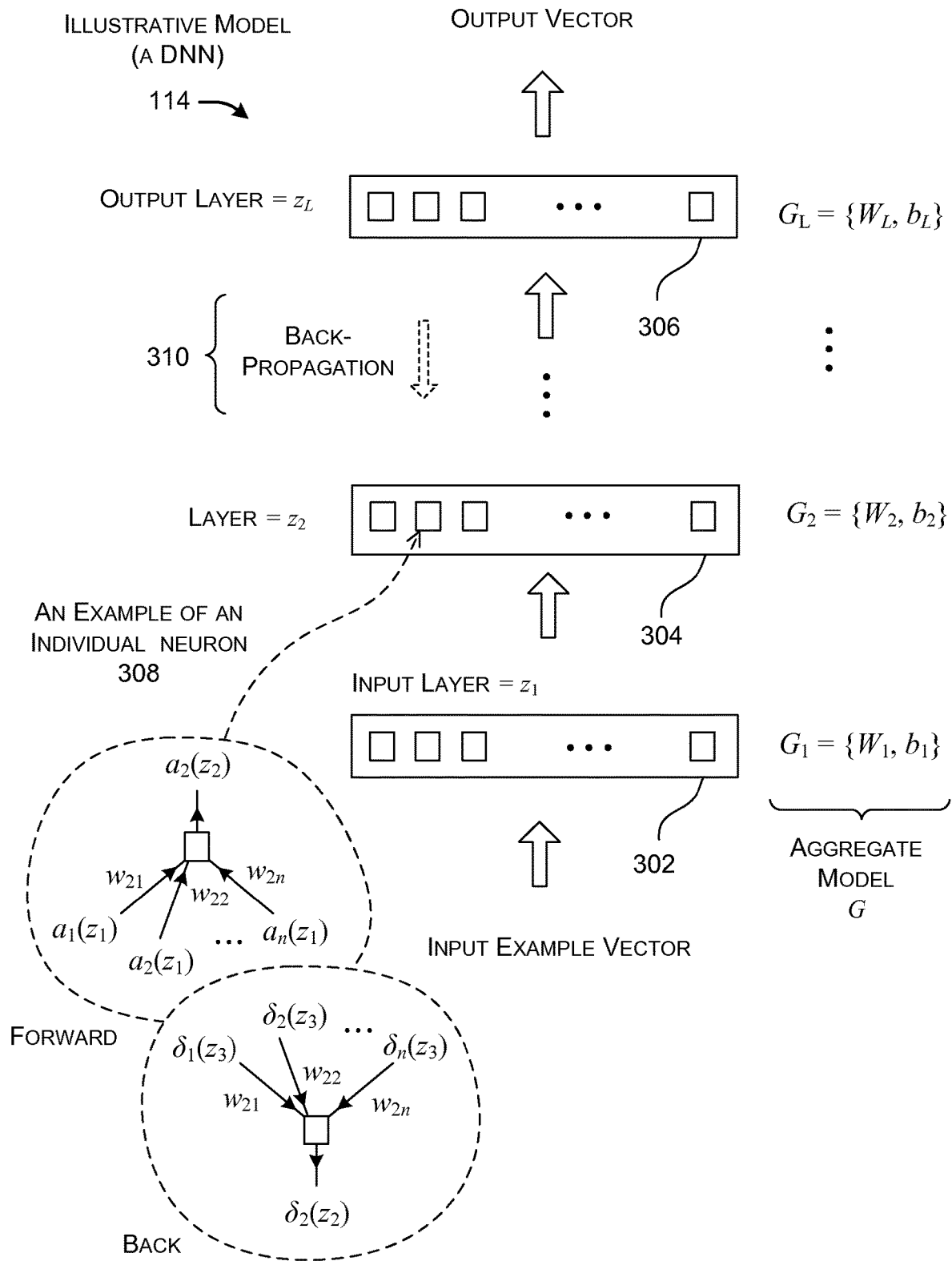
FIG. 3 shows an example of a DNN model.

FIG. 3 shows an example of one type of trained DNN model 114 that may be created by the DPS 104. The DPS 104, in turn, is produced by the framework 102 of FIG. 1. The characteristics of the DNN model 114 are presented in the spirit of illustration, not limitation; other implementations can leverage the framework 102 to produce DNN models having different characteristics. And to repeat, the framework 102 can be used to produce DPSs that act on other graphical models, besides neural networks.

The DNN model 114 includes a plurality (L) of layers, such as layer $z_1$ 302, layer $z_2$ 304, and layer $z_L$ 306. The first layer, i.e., layer $z_1$ 302, processes an input vector, e.g., which may describe an input image or some other input sample. The first layer $z_1$ 302 may therefore be referred to as the input layer. The last layer, i.e., layer $z_L$ 306, provides an output vector, which may represent a classification of the input sample. The last layer may therefore be referred to as the output layer. A given layer is also more generically referred to herein as $z_i$, or more simply z. The term (z−1) is shorthand notation for the preceding layer, $z_{i-1}$, and the term (z+1) is shorthand notation for the following layer, $z_{i+1}$. (This same notational scheme applies to other aspects of the model described below, such as threads, layer replications, etc.)

Each layer is composed of a plurality of neurons, represented in FIG. 2 as a series of small boxes. FIG. 3 also shows a more detailed depiction of one such neuron 308; that neuron 308 corresponds to the second neuron in a series of neurons within the second layer $z_2$ 304. As shown, in a forward direction of training, the neuron 308 receives input signals that emanate from individual neurons in the first layer $z_1$ 302. These input signals are referred to as input activations when viewed from the perspective of the neuron 308. For example, the neuron 308 receives a first input activation $a_1(z_1)$ which is output from the first neuron in the first layer $z_1$ 302, a second input activation $a_2(z_1)$ which is output from the second neuron in the first layer $z_1$ 302, and so on. Based on these input signals, the neuron 308 generates a single output activation $a_2(z_2)$, which serves as an input activation to neurons in the third layer $(z_3)$ (not shown).

More generally stated, in one implementation, a neuron may generate an output activation that is specified by the following equation:

$$a_i(z) = F\left(\left(\sum_{j=1}^{J} w_{ij}(z-1, z) \times a_j(z-1)\right) + b_i\right). \quad (1)$$

In other words, the output activation $a_i$ of a neuron i in a given layer z is formed by computing a weighted combination of the J input activations provided by the preceding layer (z−1), and then adding a bias factor ($b_i$) associated with the neuron i. The weighting factor $w_{ij}$ describes a weight associated with a connection between a neuron j in the layer (z−1) and the neuron i in the layer z. The above-described result is then acted upon by a non-linear activation function F(x), e.g., which may correspond to a sigmoid or hyperbolic tangent function, etc. The output activation $a_i(z)$ may be reinterpreted as an input activation when considering its contribution to the subsequent layer (z+1).

Some layers in a neural network may correspond to fully-connected layers, while other layers may correspond to convolutional layers. For a fully-connected layer, each neuron is connected to all of the neurons in the previous layer.

For a convolutional layer, each neuron is connected to only a subset of the neurons in the previous layer. In other words, for a convolutional layer, a neuron may be influenced by a local field of activations provided by the previous layer. Although not shown, other DNN models may include yet other types of layers, such as one or more pooling layers. A pooling layer summarizes features learned by a preceding layer, such as a preceding convolution layer. For example, a pooling layer may include neurons which select the maximum or minimum of activations produced by respective groupings of neurons in a preceding layer. The PIT 108 can be applied to a DNN model that possesses any graph structure and layer types, insofar as input information can be supplied to the PIT 108 which describes the DNN.

From a higher-level standpoint, the different layers in the DNN model 114 can be used to provide a hierarchical analysis of input samples. For example, the lower layers of the DNN model 114 can be used to identify low-level features of input images (such as edges, etc.), the middle layers can be used to identify midlevel characteristics (such as basic shapes, etc.), and the top level layers can be used to provide overall classifications of the input images.

The collection of weights and bias factors associated with the first layer $z_1$ 302 are represented by the symbols $W_1$ and $B_1$, respectively. Together, these parameters constitute a model $G_1$ associated with the first layer. Similarly, the second layer $z_2$ 304 is associated with a model $G_2$, and the output layer $z_L$ 306 is associated with the model $G_L$. The overall model G defines the DNN model 114, and is composed of the set of models $\{G_1, G_2, \ldots G_L\}$ for the individual layers. The model G may be very large, e.g., having a number of parameters in the gigabyte range or greater. At least part of the model G may be expressed as one or more matrices.

In the principal example described herein, the purpose of the DPS 104 is to generate the model G by iteratively operating on a corpus of training samples. More specifically, among other possible techniques, the DPS 104 may use a gradient descent technique to train the DNN model 114, such as a stochastic gradient descent technique. Such a technique comprises computations performed in successive forward and backward phases. The term "forward" refers to computations which start with the input layer $z_1$ 302 and flow upward to the output layer $z_L$ 306. The term "backward" refers to computations which flow in the opposite direction 310, starting at the output layer $z_L$ 306 and flowing back to the input layer $z_1$ 302.

More specifically, for a given training sample in the training corpus, the activation computations at each level in the forward direction are given by Equation (1) above. The computations in the background direction start with comparing the output vector (generated by the output layer $z_L$ 306), with what is considered to be, a-priori, the correct response. (Note that each of the training samples corresponds to a pair which consists of an input example and the correct response; hence, the correct response is given by the training sample.) The above-described comparison yields a plurality of error terms, δ, for the respective neurons in the output layer $z_L$ 306. More formally stated, the error terms in the output layer $z_L$ 306 are specified by the equation:

$$\delta_i(z_L) = (t_i(z_L) - a_i \times (z)) \times F'(a_i(z_L)) \qquad (2).$$

In this equation, the error term $\delta_i$ for the neuron i in the output layer $z_L$ 306 is formed by subtracting the established true value, $t_i$, from the calculated output activation value, $a_i$. That result is then multiplied by the derivative of the activation function F (x), that is F'(x).

The DPS 104 then successively calculates the error terms in the other layers through back propagation of error terms. More specifically, the error term $\delta_i(z)$ for a neuron i in a layer z can be calculated using the following equation:

$$\delta_i(z) = \left( \sum_{k=1}^{K} \delta_k(z+1) \times w_{ik}(z, z+1) \right) \times F'(a_i(z)). \qquad (3)$$

In this equation, $\delta_k(z+1)$ refers to the error term for the neuron k in the layer z+1, which follows layer z. $w_{ik}$ refers to the weight that couples neuron k in layer z+1 with neuron i in layer z. And F'(x) again refers to the derivative of the activation function. For example, FIG. 3 depicts the calculation of the error term $\delta_2(z_2)$ for the second neuron 308 in the second layer $z_2$ 304. That error term is computed by forming a weighted sum of the error terms in the preceding layer $z_3$ (not specifically shown in FIG. 3).

Finally, the DPS 104 can use the error terms computed in Equations (2) and (3) to update the weight values, using the following equation:

$$\Delta w_{ij} = \alpha \times \delta_i(z) \times a_j(z-1), \text{ for } j=1, \ldots J \qquad (4).$$

Here, the delta weight $\Delta w_{ij}$ refers to the change in the weight that couples neuron j in layer z−1 with neuron i in layer z. The matrix W that defines the collection of weights as a whole can be updated by adding the above correction factors to the existing weights, that is, $W_{updated} = W_{prior} + \Delta W$. The term α is a training parameter having an empirically chosen value.

The DPS 104 repeats the above-described forward and back propagation computations for all the samples ($N_s$) in the training corpus, corresponding to a single epoch. The amount of time that is required to process all the samples is referred to the epoch time, $T_{epoch}$. Moreover, the DPS 104 can successively performing training over plural epochs until a desired degree of accuracy is achieved. The accuracy of the trained DNN model 114 can be assessed at any point by using the DNN model 114 to operate on the samples in a hold-out validation set, and then comparing the results of that analysis to the correct results specified by the samples.

A.3. Distributed Processing Systems

As set forth in Subsection A.1, a distributed processing system (DPS) corresponds to a set of computing units 106 that performs a graph processing task, such as training the type of DNN model 114 described in Subsection A.2. Each particular DPS embodies a resource allocation architecture, reflecting its organization and configuration of its computing units 106. A resource allocation architecture, in turn, is defined with respect to a set of characteristics which allow the corresponding DPS to train the DNN model 114 in parallel fashion. FIGS. 4-7 set forth four such representative characteristics. A given DPS solution may incorporate any combination of these characteristics.

Figure 4:
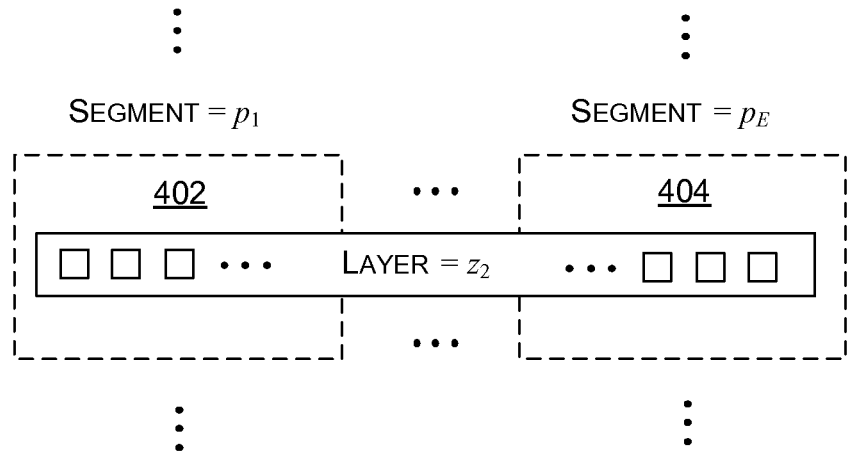

Starting with FIG. 4, a resource allocation architecture for a given DPS may entail breaking up each layer z of the full DNN model 114 into E segments (also referred to as partitions). Each segment is denoted by p, e.g., p∈[$p_1$, ..., $p_E$]. For example, FIG. 4 indicates that the layer $z_2$ of the DNN model 114 of Subsection A.2 has been broken into E segments, with segment p, 402 corresponding to the first segment, and segment $P_E$ 404 corresponding to the last segment. The E segments in any particular layer have equal sizes, where the size of a segment corresponds to the number of neurons that it encompasses. However, the numbers (and sizes) of segments across different layers may vary. That is, E can vary across layers, and E (or $E_z$) more generally refers to the number of segments in a layer z. The resource allocation architecture for a given DPS also describes the manner in which the computing units are allocated to different segments. Each computing unit that executes tasks associated with a particular segment is referred to as a worker unit herein.

Figure 5:
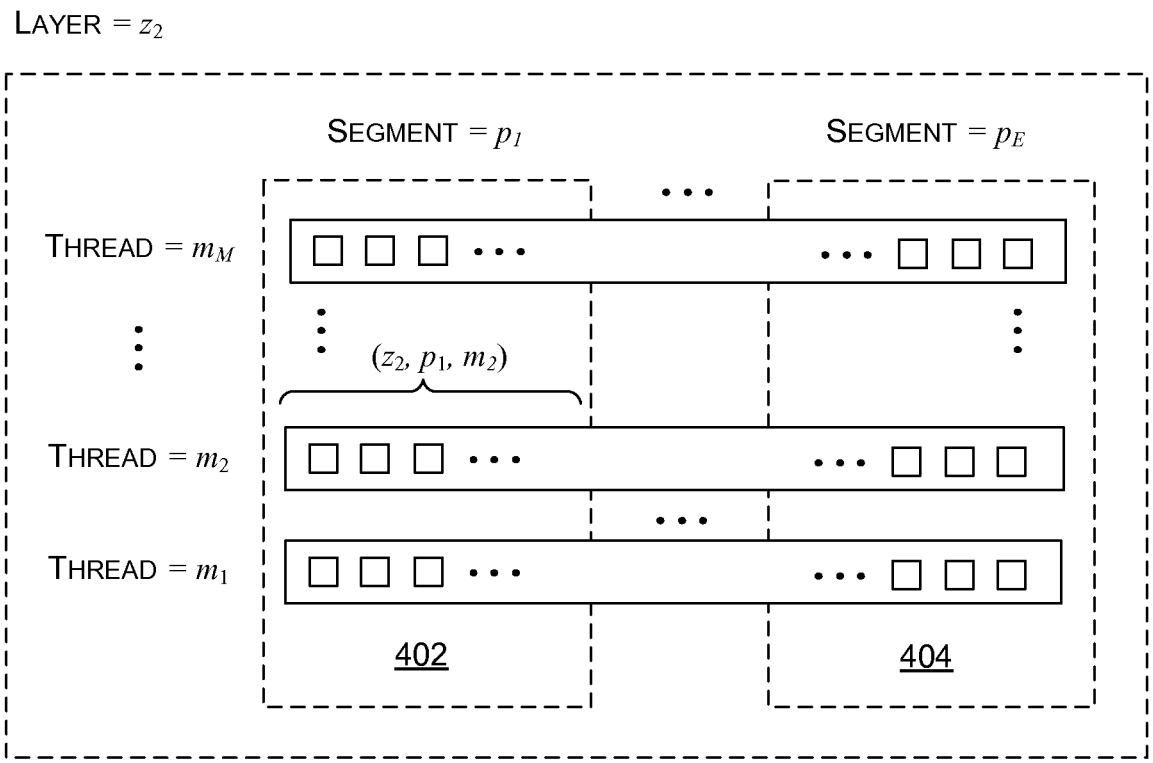

The remaining characteristics allow a DPS to process multiple training samples in parallel. For example, a resource allocation architecture may also, or alternatively, entail allocating plural threads to at least one layer of the DNN model 114, such as, as shown in FIG. 5, layer $z_2$. The threads process training samples in parallel. More specifically, each layer allocates the same number (M) of threads to its segments. However, different layers in the DNN model 114 may employ different numbers of threads. In other words, M can vary across layers, and M (or $M_z$) more generally refers to the number of threads associated with a layer z, up to a maximum possible number of threads H. The symbol m refers to an individual thread in a given layer, e.g., $m \in [m_1, m_2, \ldots m_M]$.

In terms of physical implementation, a single computing device may have plural processing cores. Each core may run a single thread. In another case, each core may run two or more threads. The threads associated with a given segment may share weights via shared memory of the hosting computing device.

As shown in FIG. 6, a resource allocation architecture for a given DPS may also, or alternatively, entail replicating one or more layers across different worker units. The replicated layers process training samples in parallel. For example, FIG. 6 shows that the resource allocation architecture uses R replicas (602, 604, . . . 606) of layer $z_2$, each denoted by the symbol r, e.g., $r \in [r_1, r_2, \ldots r_R]$. Any particular layer has the same number of replications across its segments; however, the degree of replication per layer may differ. In other words, R can vary across layers, and R (or $R_z$) more generally refers to the number replications for a layer z. Unless otherwise explicitly stated below, a layer is presumed to employ no replication.

Figure 7:
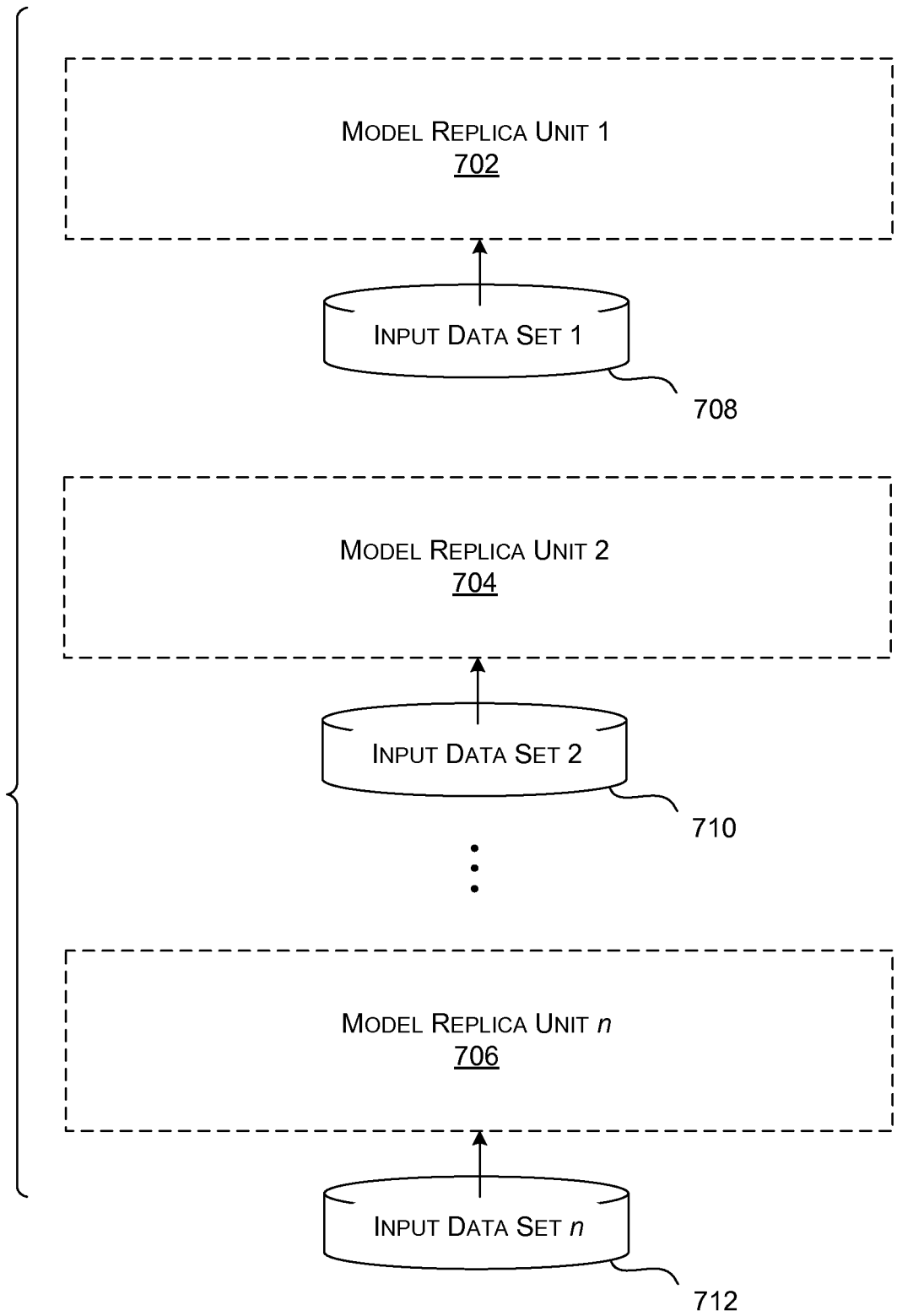

Finally, as shown in FIG. 7, a resource allocation architecture for a given DPS may also, or alternatively, use plural model replica units, such as replica units (702, 704, . . . 706). Each replica unit represents a copy of the entire DNN model 114, e.g., including all of the layers of the DNN model 114. The replica units (702, 704, . . . 706) may process different replica-specific sets of training samples in parallel, provided in respective data stores (708, 710, . . . , 712). Each replica unit includes a total number ($W_O$) of worker units.

Replica units operate in independent fashion. A DPS solution coordinates the training performed by its separate replica units using one or more parameter modules (not shown in FIG. 8), referred to in the singular below for simplicity. For example, the parameter module periodically receives delta weight values computed by the individual replica units, e.g., using Equation (4) above. The parameter module updates a global full weight matrix W upon receiving an instance of delta weight values from any replica unit, e.g., by adding the delta weight values to that full weight matrix W. The parameter module also periodically sends an instance of the full weight matrix W to each replica unit, for use by the replica unit in subsequently performing its training. That is, upon receipt of the full weight matrix W, the individual layers in the worker units of a replica unit will update their previous weights so that they conform to the new, more current, weights specified in the updated matrix W. The information exchanged between the parameter module and the replica units is more generally referred to below as "weight information."

The asynchronous nature of the training performed by a DPS means that it is not necessary for the DPS to exchange weight information with the parameter module each time a replica unit processes an individual training sample. Rather, a developer will typically set up the DPS such that weight information is sent to the parameter module after a first prescribed number of training examples are processed, and weight information is received from the parameter module after a second prescribed number of training examples are processed (where the first prescribed number can be the same or different with respect to the second prescribed number). This means that each replica unit may be performing training based on somewhat stale weight information at any given time (meaning that the replica unit's weight matrix may not capture the most current version of the weight matrix, maintained by the parameter module). Nevertheless, this issue does not negatively affect the training of the DNN model 114, and, indeed, the "lazy" exchange of weight information constitutes noise which may actually improve the quality of the trained DNN model 114.

Figure 8:
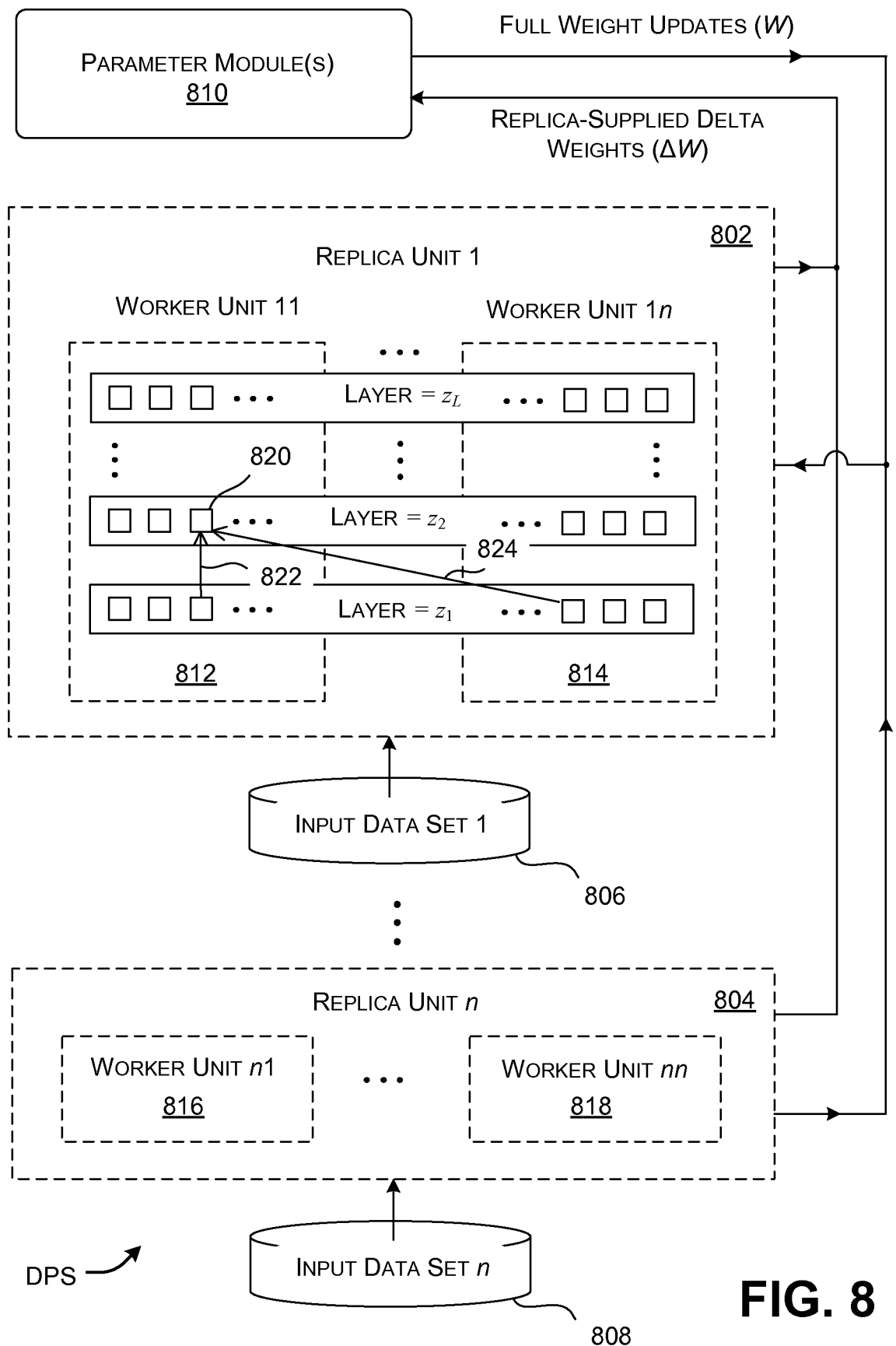
FIG. 8 shows an example of a distributed processing system for training the DNN model of FIG. 2.

FIG. 8 summarizes the concepts set forth in this subsection by showing a configuration of one illustrative DPS, which incorporates a combination of the characteristics set forth above. The DPS includes at least two model replica units (802, 804, . . . ) which process replica-specific sets of training samples in parallel, stored in respective data stores (806, 808, . . . ). The replica units (802, 804, . . . ) further exchange weight information with at least one parameter module 810. Each individual replica unit, in turn, includes at least two worker units. For instance, the replica unit 802 includes worker units (812, 814, . . . ), while the replica unit 805 includes worker units (816, 818, . . . ).

In one non-limiting case, assume that each worker unit in each replica unit handles a respective subset of the neurons across the different layers ($z_1, \ldots z_L$). For example, for the simplified case of two partitions, the first partition can handle the first half of the neurons across the layers, while the second partition can handle the second half of the neurons across the layers. This is merely one simplified example; more generally, a resource allocation architecture can map partitions to worker units in any manner across the different layers (as will be described below in greater detail). Although not shown, a local area network may communicatively couple the worker units together within each replica unit.

Consider a particular neuron 820 in the second layer of the DNN model 114; that neuron 820 belongs to a segment that is allocated to the first worker unit 812. In the forward phase of training, that neuron 820 receives activations from all or some of the neurons in the preceding (first) layer. But because that preceding layer is partitioned, a subset of those activations may originate from the local worker unit 812 (e.g., as is the case for the representative activation 822), while another subset of activations may originate from non-local worker units, such as the worker unit 814 (e.g., as is the case for the representative activation 824). The same is true when considering the computation of error terms and weight updates for the neuron 820; a portion of the input error terms (from the third layer), that the neuron 820 needs to compute its own error term, may originate from the local worker unit 812, while another portion may originate from non-local worker units.

The DPS may exchange information across worker units, within a replica unit, as messages. Note, however, that there is a cost associated with the exchange of messages across worker units. More specifically, in the forward direction of training, the neurons of a segment must wait to receive activations from non-local worker units. In the back propagation direction of training, the neurons of a segment must wait to receive error terms from non-local worker units. On the other hand, a neuron may asynchronously send activations and error terms to connected neurons, so there is no communication costs associated with the sending operations performed by neurons.

In a similar manner, there is a cost associated with the exchange of weight information between the replica units (802, 804, . . . ) and the parameter module 810. More specifically, the layers of each replica unit must wait to receive updated weights from the parameter module 810. The layers may asynchronously send delta weight values to the parameter module 810, so there is no communication cost associated with the uploading operation.

A.4. Overview of the Performance Investigation Tool (PIT)

Figure 9:
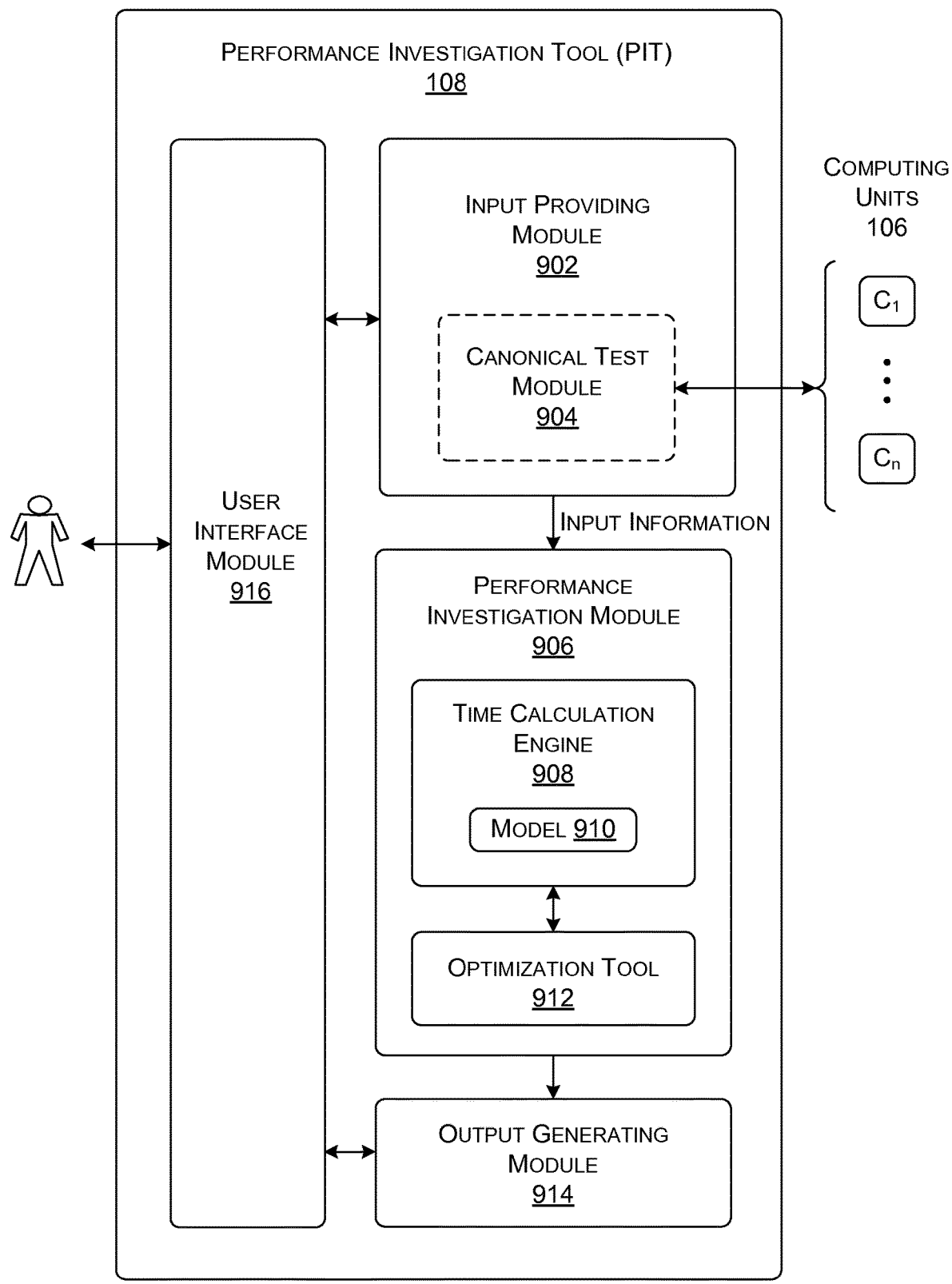
FIG. 9 shows an illustrative performance investigation tool (PIT), which may be used to investigate the performance of the DNN of FIG. 2, within the framework of FIG. 1.
Figure 10:
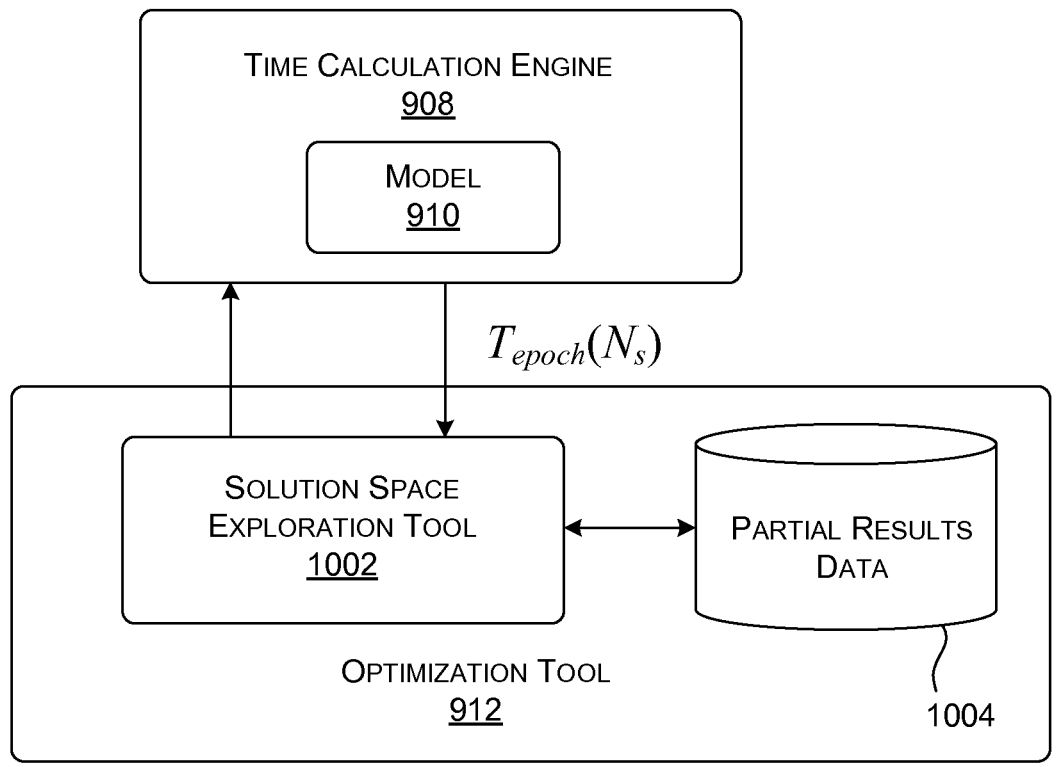
FIG. 10 shows one implementation of an optimization tool, which is an optional component of the PIT of FIG. 9, used in an automated mode of operation.

Advancing now to FIG. 9, this figure shows one implementation of the PIT 108. Generally, the PIT 108 generates one or more time-based performance measures which estimate the prospective performance of a candidate DPS. For example, the PIT 108 generates one or more time-based performance measures which provide insight into the amount of time that will be involved in training the DNN model 114 of FIG. 2, using, for example, some variant of the resource allocation architecture shown in FIG. 8, or some other resource allocation architecture. The modeling performed by the PIT 108 is predictive, meaning that it is performed without actually performing training using the candidate DPS.

As previously described in Subsection A.1, the PIT 108 may operate in at least two modes of operation: manual and automated. In the manual mode, a developer may manually describe the characteristics of one or more candidate DPSs. The PIT 108 can then assess the time-based performance of each such candidate DPS. In the automated mode, the PIT 108 can automatically explore a space of candidate DPS solutions, and pick one or more desirable solutions, such as the solution which offers the shortest training time.

More specifically, the PIT 108 may include an input providing module 902 for receiving information which describes the characteristics of the candidate DPS under consideration. In the manual mode, the input information may, for instance, describe the structure of the DNN model 114 itself, the resource allocation architecture of the candidate DPS, the type of computing units 106 used in the candidate DPS, and so on. In the automated mode, the input information may more generally describe one or more constraints that a desirable DPS is expected to satisfy, but without fully describing that DPS solution.

A canonical test module 904 may perform one or more tests on the computing units 106 to determine the speed(s) at which they perform computations and/or engage in communication. The output results provided by such a test constitute another instance of input information collected by the input providing module 902. The canonical test module 904 may resort to these tests due to the difficulty of theoretically modeling certain behavior of the computing units 106, e.g., due to the complex runtime behavior of the computing units 106 (such as caching, etc.).

The following explanation provides additional information regarding the operation of the canonical test module 904. By way of preview, the canonical test module 904 performs tests that mimic the type of computations and/or communications that are involved in an actual training operation. The canonical test module 904 also then measures the speed at which the tests are performed.

A performance investigation module 906 generates one or more time-based performance measures which describe the performance of the candidate DPS under consideration, based on the input information collected by the input providing module 902. More specifically, a time calculation engine 908 estimates an amount of time that it will take to train the DNN model 114, using the candidate DPS under consideration. The time calculation engine 908 applies a model 910 to perform this task. For instance, the model 910 may correspond to an equation that computes the time that is required to process all of the $N_s$ samples in a training corpus. In other words, the model 910 computes the epoch time $T_{epoch}$ for the DPS under consideration. Subsection A.5 (below) provides further illustrative details regarding the operation of the time calculation engine 908.

An optimization tool 912 may explore different candidate DPS solutions in a design space of such solutions. The optimization tool 912 interacts with the time calculation engine 908 to compute $T_{epoch}$ for each such candidate solution. The optimization tool 912 may then pick at least one DPS solution having acceptable performance. For example, the optimization tool 912 may automatically find the DPS solution having the shortest training time. Subsection A.6 (below) provides further illustrative details regarding the operation of the optimization tool 912.

The PIT 108 also includes an output generating module 914 for presenting output information to the model developer (or any other user of the PIT 108). The output information conveys the time-based measures computed by the performance investigation module 906.

A developer (or other user) may interact with the input providing module 902 and the output generating module 914 via a user interface module 916. The user interface module 916 may be implemented by code or other logic that is resident on the processing system 204 of FIG. 2 and/or on the user's local computing device 208. Subsection A.7 (below) provides further illustrative details regarding the operation of the user interface module 916.

A.5. Time Calculation Engine

The following explanation provides additional information regarding one implementation of the model 910, provided by the time calculation engine 908. To begin with, the time ($T_{epoch}$) required to process all $N_s$ samples in a corpus of training samples corresponds to a summation of the times that the DPS spends in processing the individuals samples in the corpus. That is, $T_{sample}$ refers to the amount of time required to process an individual sample. The time $T_{sample}$, in turn, corresponds to the summation of times that the DPS spends in processing the individual layers of the DNN model 114, with respect to the particular sample. In other words, $$T_{sample} = \sum_{z=1}^{L} T(z). \tag{5}$$

In this equation, T(z) refers to the amount of time spent in training an individual layer z of the DNN model 114, where the layers range from layer $z_1$ to layer $z_L$. The amount of time spent on any particular layer z can be further broken down into the amount of time spent in performing forward evaluation (F), back propagation (B), and the updating of weights (W), as in the following equation:

$$T(z) = T_F(z) + T_B(z) + T_W(z) \quad (6)$$

In this equation, $T_F(z)$ refers to the amount of time spent in performing forward evaluation using Equation (1), $T_B(z)$ refers to the amount of time spent in performing backward propagation using Equation (3), and $T_W(z)$ refers to the amount of time spent in updating the weights using Equation (4).

The values for the above times ($T_F(z)$, $T_B(z)$, and $T_W(z)$) can be derived by first considering the simplified case in which the DPS under consideration includes a single replica unit. As in the case of FIG. 4, the replica unit partitions each layer of the DNN model 114 into segments of equal size. The worker units operate on the segments in parallel fashion. To further simplify the analysis, initially assume that the DPS does not process individual layers using plural threads (as was illustrated in FIG. 5); nor does the DPS replicate any layer of the DNN model 114 (as was illustrated in FIG. 6).

Note that worker units operate on the segments of a particular layer in parallel, and that the segments within a given layer have the same size. (Further assume that, for a given layer, each worker unit processes at most one segment from that layer.) Hence, for a particular layer, each worker unit can be expected to complete its processing on its segment at the same time as the others. As a further consequence, the amount of time that is required to process the entire layer z is equal to the amount of time that is required by any worker unit to process an individual segment p within that layer. In other words, $T_F(z) \approx T_F(z, p)$, $T_B(z) \approx T_B(z, p)$, and $T_W(z) \approx T_W(z, p)$, where p refers to any particular segment in the set of segments that make up the layer z. Hence, the computation of the time required to process an individual layer z will be described below in the context of the time required to process any given segment p in that layer.

Forward Evaluation Time.

Starting with the forward equation time, $T_F(z, p)$, this variable refers to the amount of time that is required to generate the activations for the neurons in the segment p of the layer z, using Equation (1). That time, in turn, can be further broken down as a sum of $P_F(z, p)$ and $M_F(z, p)$. $P_F(z, p)$ refers to the amount of time that is required to actually perform the computations of Equation (1). The term $M_F(z, p)$ refers to the communication cost associated with the manner in which the local worker unit (that is handling the segment p for layer z) interacts with non-local worker units.

The computation time $P_F(z, p)$ can be expressed as:

$$P_F(z,p) = N_{neurons}(z,p) \times (C_{MultAdd} \times W_i(z) + C_{Act}) \quad (7)$$

In this equation, $N_{neurons}(z, p)$ refers to the number of neurons in segment p of layer z. $(C_{MultAdd} \times W_i(z) + C_{Act})$ refers to the amount of time spent in computing the activation for each neuron i in the segment p. That is, $C_{MultAdd}$ represents that time that is required to multiply an activation from a neuron j in the preceding layer (z−1) by a weighting value $w_{ij}$, and then add that product to the current sum of products formed thus far. $W_i(z)$ denotes the number of connections from layer (z−1) to layer z that affect the neuron i, and $C_{Act}$ refers to the amount of time that is required to apply the activation function F (x).

In many environments, it may be difficult to analytically reason about the values $C_{MultAdd}$ and $C_{Act}$, since these values depend on complex and dynamically changing runtime phenomena. Therefore, the canonical test module 904 can compute these values by performing actual computations that simulate the work performed by Equation (1), for the given partition p, for a given actual computing unit to be used in constructing the DPS. In other words, the canonical test module 904 can compute the output activations for a collection of neurons, given some corpus of real or dummy training samples. The canonical test module 904 can then empirically compute $C_{MultAdd}$ and $C_{Act}$ based on the results of such a test.

As to the communication cost ($M_F(z, p)$), the neurons in segment p can asynchronously send their output activations to layer (z+1), and thus there is no cost associated with this particular operation. But the neurons are dependent on the timing at which input activations are received from layer (z−1). In particular, the neurons in segment p (which are hosted by a local worker unit) are dependent on the timing of that subset of input activations that are received from non-local worker units (if any).

In one implementation, the communication cost $M_F(z, p)$ can be computed as follows:

$$M_F(z, p) = C_{NCost} + \frac{R_F(z, p) \times C_{BitsPerAct}}{C_{NBandwidth}}. \quad (8)$$

In this equation, $C_{NCost}$ refers to the network latency of sending one bit of data between two worker units. $C_{NBandwidth}$ refers to the bandwidth of the worker unit's interface mechanism, e.g., its network interface controller (NIC). $R_F(z, p)$ refers to the number of remote activations that the segment p receives from layer (z−1) from non-local (remote) worker units, and $C_{BitsPerAct}$ refers to size of each activation that the segment p receives. That is, $R_F(z, p) \times C_{BitsPerAct}$ refers to the amount of data bits received by p from remote sources. The PIT 108 can obtain the values of $C_{NBandwidth}$ and $C_{BitsPerAct}$ by running tests on a computing unit using the canonical test module 904, and/or based on established reference sources (e.g., device specification resources), if available.

Backward Evaluation Time.

The time $T_B(z, p)$ can be decomposed into the time $P_B(z, p)$ that is required to perform the actual computations (using Equation (3)), and the time $M_B(z, p)$ that is necessary to receive the input error terms from layer (z+1). The time $P_B(z, p)$ that is required to compute error terms for the neurons in partition p may be given by the following equation:

$$P_B(z,p) = N_{neurons}(z,p) \times (C_{MultAdd} \times W'_i(z) + C_{Err}) \quad (9).$$

The term $N_{neurons}(z, p)$ refers to the number of neurons in segment p of layer z. $C_{MultAdd}$ refers to the amount of time that is required to perform an individual multiply-add operation in Equation (3). $W'_i(z)$ refers to the number of connections from neurons in layer (z+1) to neuron i in layer z. And $C_{Err}$ refers to the amount of time that is required to apply the error function F'(x) in Equation (3). The PIT 108 can provide the values for $C_{MultAdd}$ and $C_{Err}$ by using the canonical test module 904 to runs tests on an actual computing unit, e.g., in the same manner described above for the forward evaluation phase of analysis.

As to communication time ($M_B(z, p)$), some input error term values may originate from the local worker unit that works on the segment (z, p), while other input error terms may originate from non-local worker units; there is a communication cost associated with the receipt of information from the non-local worker units, but not from the local worker unit. Hence, the value of $M_B(z, p)$ can be computed using Equation (8), with the exception that $R_F(z, p)$ in Equation (8) is replaced by $R_B(z, p)$, corresponding to the number of error terms received from the non-local worker units. The neurons in segment (z, p) can asynchronously send their output error terms to the connected neurons in layer (z−1), so there is no communication cost associated with that operation.

Weight Update Time.

As described in Equation (4), the delta weight $\Delta w_{ij}(z, z+1)$ for the connection between neuron j in layer (z+1) and neuron i in layer z is computed from the error term $\delta_j(z+1)$ of neuron j and the activation $a_i(z)$ of neuron i. The full weight value $w_{ij}(z, z+1)$ can then be updated by adding the value of $\Delta w_{ij}(z, z+1)$ to it. Thus, the following equation can be used to calculate the amount of time that is required to perform weight updates for segment p in layer z:

$$P_W(z,p) = N_{neurons}(z,p) \times (C_{MultAdd} \times W'_i(z)) \qquad (10).$$

The terms $N_{neurons}(z, p)$, $C_{MultAdd}$, and $W'_i$ have the same meaning as set forth above. As a final point, note that the analysis has thus far only considered the case in which the DNN model 114 includes a single replica unit. Hence, there is no need in such a model to communicate weights to a parameter module, and hence there is no cost associated with such a task. That is, $M_W(z, p)$, the amount of time required to communicate weight updates, is zero.

Adding the Effects of Thread Parallelism.

Assume now that each worker unit has the capability of running plural threads at the same time. For example, each worker unit may include plural processing cores which run plural respective threads. A DPS may leverage this capability by using the plural threads of the processing cores to process training samples in parallel, while asynchronously sharing weights using shared memory. The symbol M (or $M_z$) refers to the number of threads that are being run for a given segment p for a given layer z, and m or ($m_t$) refers to a particular thread in a group of threads.

The use of threads affects the amount of time that is required to generate computations, (e.g., $P_F(z, p)$, $P_B(z, p)$, and $P_W(z, p)$), as well a the amount of time that is required to perform communications across worker units (e.g., $M_F(z, p)$ and $M_B(z, p)$). For simplicity below, let the symbol i correspond to a member of the set {F, B, W}, such that $P_i$ refers to the processing cost associated with forward evaluation, back propagation, or weight updating, depending on the value of i. Similarly, $M_i$ refers to the communication cost associated with forward evaluation, back propagation, or weight updating, depending on the value of i.

With respect to the computation times ($P_i$), note that the threads running on a particular worker unit may interfere with each other, e.g., due to the fact that they are competing for memory bandwidth. A factor $C_f(M)$ quantifies the degree of such interference for the case in which M threads are running in parallel. As such, the amount of time that is required to perform computations on a given segment p and thread m (where m is a member in the set of M threads), and for a given layer z, can be expressed as:

$$P_i(z,p,m) = C_f(M) \times P_i(z,p,1) \qquad (11).$$

Here, $P_i(z, p, 1)$ corresponds to the amount of time that it takes a worker unit to perform computations (for any of forward evaluation, backward evaluation, or weight updating phases) for the case in which only one thread is used, e.g., for which M=1. In other words, $P_i(z, p, 1)$ is described by the equations set forth above for $P_F(z, p)$, $P_B(z, p)$, and $P_W(z, p)$. The factor $C_f(M)$ corresponds to the ratio of plural-threaded computation time (for which M is greater than 1) and the single-threaded computation time (for which M is 1). The canonical test module 904 may generate the value of $C_f(M)$ by running appropriate tests for the plural-thread case and the single-threaded case.

While the factor $C_f(M)$ may have the effect of slowing down the processing in any individual thread m, overall, worker units are now running threads in parallel on different training samples. Another factor, $N_p(z)$ defines the extent to which processing is expedited as a result of the use of plural threads to process training samples in parallel, e.g., with respect segment p and layer z, and with respect to the total number of samples ($N_s$) in the training corpus. Here, $N_p(z)$ equals the total number of threads being run in parallel for layer z, e.g., M. Overall, the per-sample execution time ($P_i(z, p, m)$) and the data parallelism degree factor ($N_p(z)$) define the epoch-level savings of time that can be gained through the use of threads to process input samples in parallel, for layer z and partition p.

The communication cost for layer z, segment p, and thread m may be expressed as follows:

$$M_i(z, p, m) = C_{NCost}(M) + \frac{R_i(z, p, m) \times C_{BitsPerAct}}{C_{NBandwidth}(M)}. \qquad (12)$$

$C_{NBandwidth}(M)$ refers to $1/M^{th}$ of the total $C_{NBandwidth}$ that would be available to a single thread. In other words, $C_{NBandwidth}(M)$ takes into account that the total available bandwidth is now shared among M threads. $C_{NCost}(M)$ refers to the network latency for the case in which M threads are used. Generally, the latency cost can increase when communication participants establish M concurrent connections. In one case, the canonical test module 904 can run a test to generate a value for $C_{NCost}(M)$. $R_i(z, p, m)$ refers to the number of input terms that are received from remote sources, for the case of layer z, segment p, and segment m. $C_{BitsPerAct}$, as before, refers to the size of each input term.

Adding the Effects of Layer Replication.

In the case of layer replication, a DPS replicates a layer of the DNN model 114 across worker units. R (or $R_z$) refers to the total number of replications for a given layer z, and r (or $r_i$) refers to a particular replicated layer within the set of replicated layers for layer z. The computation time for a given layer z, segment p, thread m, and layer replication r is $P_i(z, p, m, r)$, and is given by Equation (11) above. However, the replication degree for a segment p in layer z now becomes $N_p(z) = M \times R$. The communication time for a given layer z, segment p, thread m, and layer replication r is $M_i(z, p, m, r)$, and is given by Equation (12) above.

Adding the Effects of Model Replication.

Finally, consider the case in which the DPS now includes two or more model replica units (e.g., $R_A$ model replicas), as shown in FIG. 8. Each replica unit operates in the same manner described above for the case of a single replica unit, except that, now, the replica units exchange weight information with the parameter module (or modules) 810 of FIG. 8.

Because each replica unit is performing the same computations as before, its processing time ($P_i$) is the same as previously stated, except that the parallelism degree for a layer z and a segment p is now given by $N_p(z) = M \times R \times R_A$. Further note that the communication cost ($M_i$) for exchanging messages within a particular replica unit (when calculating forward activations and backward propagation error terms) remains as given above.

However, the use of plural replica units imposes a new communication cost associated with the exchange of weight information. In particular, the individual layers of worker units send updated local weight information (e.g., Δw values) to the parameter module 810, and the individual layers, in turn, receive updated global weight information from the parameter module 810. The updated global weight information reflects the outcome of the weight synchronization operation performed by the parameter module 810. In particular, a value $N_{read}$ corresponds to the frequency at which the worker units within a replica unit read updated weight information from the parameter module 810, which corresponds to the number of training samples processed by the replica unit before it pulls in the updated weight information from the parameter module 810.

The act of sending updated weight information from the replica units to the parameter module 810 can be performed asynchronously, and therefore does not hold up the processing performed by the replica units, and therefore does not impose a communication cost. The act of receiving updated weight information does affect the timing of the operations performed by the replica units, and therefore imposes a communication cost.

In a worst-case scenario, all the replica units simultaneously read weight information from the same parameter module, and therefore, the bandwidth of the parameter module to each replica unit become minimum. The time to read the weight information across the replica units becomes:

$$T_{READ}^{max} = \sum_{z=1}^{L} \left( C_{NCost}(M) + \frac{R_A \times D_{Weight}(z)}{C_{NBandwidth}(M)/R_A} \right). \quad (13)$$

The new term in this equation, $D_{weight}(z)$, refers to the data size of all weights for layer z. The most favorable case, on the other hand, occurs when: (a) a single replica unit can read weight information from a plural number $(S_P)$ of parameter modules using their accumulated bandwidth; and (b) the replica units stagger the times at which they receive the weight information so there is no overlap among replica units. For this scenario, the time to read the weight information becomes:

$$T_{READ}^{min} = \sum_{z=1}^{L} \left( C_{NCost}(M) + \frac{R_A \times D_{Weight}(z)}{C_{NBandwidth}(M) \times S_P} \right). \quad (14)$$

In actual practice, the weight-updating communication cost may lie somewhere between the values provided by Equations (13) and (14). Moreover, a DPS can perform optimization to improve this cost, e.g., by scheduling the reading times for different replica units to minimize their overlap.

Summary.

The time that a DPS solution takes to compute all of the samples in a training corpus can be expressed as:

$$T_{epoch}(N_s) = \frac{T_{READ} \times N_s}{N_{read}} + \quad (15)$$

$$\sum_{z=1}^{L} \{[P_F(z, p, m, r) + M_F(z, p, m, r) + P_B(z, p, m, r) +$$

-continued
$$M_B(z, p, m, r) + P_W(z, p, m, r)] \times N_s/N_p(z)\}.$$

In the manual mode of operation, the performance investigation module 906 generates a $T_{epoch}$ value for each particular candidate DPS that has been manually described by the developer. In the automated mode of operation, the performance investigation module 906 can calculate a $T_{epoch}$ value for each candidate DPS solution that is automatically identified by the optimization tool 912. The optimization tool 912 then picks the DPS solution with the smallest $T_{epoch}$, or a set of DPS solutions with suitably small $T_{epoch}$ values.

In either case, a DPS solution is defined by input information along three main dimensions. First, the input information includes parameters which define resources to be used, including the number of parameter modules $(S_P)$, a number of replica units $(R_A)$, a number of worker units $(W_O)$ per replica unit, and a maximum number H of threads per worker unit. Second, the input information specifies parameters that define a number partitions and replications at each layer of the DNN model 114. Third, the input information describes the manner in which resources are mapped to the features of the DNN model 114, such as the manner in which segments are mapped to worker units, etc.

A given DPS solution requires a prescribed number of computing units 106 to implement it, such as $(S_P + R_A \times W_O)$ machines. Suppose that a developer has a total number $D_A$ of computing devices which can be deployed for use in the DPS solution. Hence, to build the DPS solution, $(S_P + R_A \times W_O)$ must be equal to or less than $D_A$.

A.6. Optimization Tool

According to one approach, the optimization tool 912 can perform a brute-force exploration of all of the different combinations of the parameters in Equation (15), or a subset thereof. The optimization tool 912 can compute $T_{epoch}$ for each such permutation, and then pick the DPS solution that offers the best solution. However, the search space associated with the different permutations of parameters is extremely large, and, in fact, it is exponential with respect to the number of worker modules and the number of layers in the DNN model 114.

To fully appreciate the complexity of the search space, first consider that a DPS solution can be varied with respect to any of the variables $(S_P, R_A, W_O)$, where again, $S_P$ refers to the number of parameter modules being used, $R_A$ refers to the number of replica units being used, and $W_O$ refers to the number of worker units in each replica unit. Variations with respect to these parameters yield at most $D_A$ combinations, where $D_A$ refers to the total number of devices that are available.

In addition, within any one of the above combinations, a DPS solution can assign a different number of partitions to each layer and a different number of layer replications, together yielding another $D_A$ combinations. In addition, a DPS solution can deploy up to a total number H of possible threads. Further still, a DPS solution can map segments to workers in different ways, yielding another $D_A!$ possible combinations. Together, the search space has a complexity that can be expressed as $O(D_A^3[H \times D_A^2 \times (D_A!)]^L)$, which, as said, is exponential in nature.

The optimization tool 912 includes a solution space exploration tool 1002 ("exploration tool" for brevity) that explores the search space in an efficient manner, e.g., by converting the search from a problem of exponential complexity (that may be computed in exponential time) to a problem with polynomial complexity (that can be computed in polynomial time). As a result of these changes, the optimization tool 912 can find the optimum DPS solution in much less time compared to the brute force method.

To achieve the above effect, the exploration tool 1002 leverages at least two techniques in combination. A first technique corresponds to an expedited manner of assigning segments to worker units, while the second technique corresponds to an expedited manner of determining the composition of individual layers within the DNN model 114, such as by deciding how many partitions to create for each layer, how many replications to create for each layer (if any), and how many threads to devote to each layer. The following explanation describes each of these two techniques, followed by a description of one manner in which the two techniques can be combined.

As to the first technique, for each segment under consideration in a given layer, the exploration tool 1002 determines the number of remote connection that would be required in response to assigning that segment to a particular worker unit. A remote connection refers to an exchange of information between the particular worker unit and another worker unit (e.g., for the purpose receiving activations from a "lower" layer, or for the purpose of receiving error terms from a "higher" layer). The exploration tool 1002 then assigns the segment to the worker unit having the minimum number of such remote connections. The exploration tool 1002 successively applies this analysis to the entire DNN model 114, starting at the first layer $z_1$ and proceeding to the last layer $z_L$.

Figure 11:
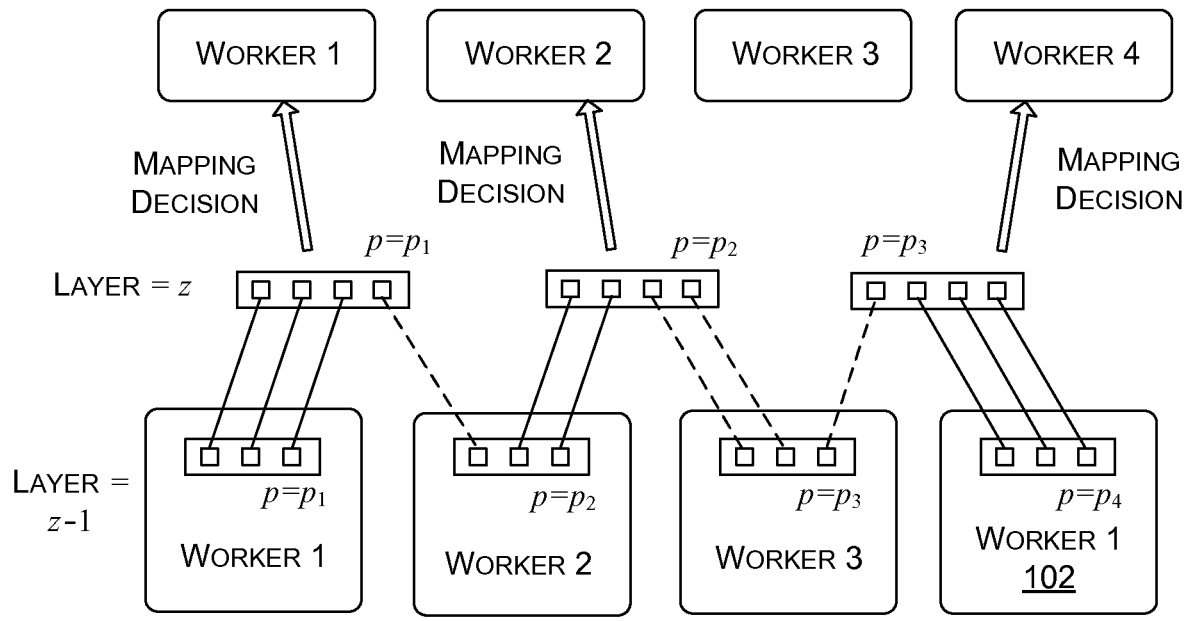
FIG. 11 is an example which depicts a segment-to-worker assignment operation that may be performed by the optimization tool of FIG. 10.

For example, in the simplified example of FIG. 11, assume that, in layer z−1, four segments ($p_1$, $p_2$, $p_3$, $p_4$) have been assigned to worker units 1, 2, 3, and 4 respectively. Further assume that the exploration tool 1002 seeks to allocate three partitions ($p_1$, $p_2$ $p_3$) within layer z to three of the four available worker units. Assigning the first partition ($p_1$) of layer z to the first worker unit will produce one remote connection (e.g., from worker unit 2 to worker unit 1). Assigning the first partition to worker unit 2 will require three remote connections, and assigning the first partition to worker units 3 or 4 will require four remote connections each. Hence, the exploration tool 1002 assigns the first partition to the first worker unit because that assignment entails the fewest number of remote connections (e.g., one connection). The exploration tool 1002 successively applies the same analysis to the other partitions within layer z. The exploration tool 1002 can apply any strategy for assigning segments to worker units for the first layer, e.g., by randomly assigning the segments to the worker units.

In rare cases, there may be two or more allocation choices that will produce the same number of remote connections. The exploration tool 1002 can apply any type of environment-specific rules to break such a tie, such as by randomly assigning a segment to one of the equally-ranked worker unit choices.

The above computation, performed for each layer, reduces the complexity of the mapping problem from $O(D_A!)$ to $O(D_A^2)$, yielding an overall reduced search space complexity of $O(D_A^3[H \times D_A^4]^L)$.

The second technique operates by determining the composition of each layer of the DNN model 114 using a dynamic programming technique. For ease of explanation, first consider the case in which the second technique is applied for the limited purpose of choosing the number of partitions ($E_z$) for each layer z of the DNN model 114. In general, a dynamic programming technique involves breaking a large problem into component parts, and solving the problem in piecemeal fashion by solving its individual parts. A data store stores the output results of the analysis performed with respect to the individual parts. Whenever possible, when performing its analysis, the dynamic programming technique reuses output results that have already been generated and stored in the data store, rather than repeating analysis that has already been performed.

In the present case, the exploration tool 1002 leverages a finding that an optimal solution, up to layer z, can be constructed using the optimal solutions to the sub-problems for up to layer z−1. The exploration tool 1002 successively applies this principle to the layers of the DNN model 114, that is, by starting at layer z=1, and advancing to the last layer z=L. In performing the analysis for any given layer z, the exploration tool 1002 uses the output results that have been computed for previous layers, which are stored in data store 1004.

More specifically, for the simplified case in which the only variable in play is the number of partitions in each layer, the optimal accumulated training time from layer 1 to layer z, with respect to $E_z$ partitions in layer z, can be expressed as:

$$T_{epoch}([1, z], E_z) = \min_{1 \leq E_{z-1} \leq D_A} \quad (16)$$
$$[T_{epoch}([1, z-1], E_{z-1}) + P(z, E_z) + M(z, z-1, E_z, E_{z-1})].$$

In this equation, $P(z, E_z)$ refers to the computation time of layer z having $E_z$ partitions. $M(z, z-1, E_z, E_{z-1})$ refers to the communication time between layer z−1 and layer z, where there are $E_z$ partitions in layer z and $E_{z-1}$ partitions in layer z−1. $T_{epoch}([1, z-1], E_{z-1})$ refers to the accumulated training time from layer 1 to layer z−1, when layer z−1 has $E_{z-1}$ partitions. More specifically, the minimum operator (min) in Equation (16) means that this equation is evaluated with respect to different values of $E_{z-1}$ for layer z−1 to provide a set of values, and then the smallest value in that set is chosen as the value of $T_{epoch}([1, z], E_z)$, for one specific value of $E_z$.

From yet a higher level standpoint, the exploration tool 1002 repeats the above-described analysis of Equation (16) for different values for $E_z$. This yields a master set of $T_{epoch}$ values for the different values of $E_z$, e.g., from 1 to $D_A$. The exploration tool 1002 then selects the value of $E_z$ for layer z that yields the smallest $T_{epoch}$ value in the master set. In other words, that value of $E_z$ corresponds to the number of partitions to be used in layer z.

In performing the above computations, the exploration tool 1002 can rely on prior output results that have already been stored in the data store 1004. For example, the values of $T_{epoch}([1, z-1], E_{z-1})$ pertain to output results that would have already been computed when the layer z−1 was the focus of analysis. Hence, the exploration tool 1002 does not need to re-compute those values when performing its analysis for layer z.

The first layer (z=1) represents a special case because it has no previous layer z−1. For that layer, $T_{epoch}([1,1], E_1) = P(1, E_1)$. The exploration tool 1002 can evaluate this equation for different values $E_1$, and then pick the value of $E_1$ that yields the smallest $T_{epoch}$.

To get each $T_{epoch}([1, z], E_z)$ value, the cost is $D_A$ times the corresponding segment-worker mapping cost (associated with the above-described first technique), yielding a net cost of $D_A^3$. The complexity increases to $O(D_A^4)$ when different layer replication possibilities are also taken into account. With respect to all layers L, the cost therefore becomes $O(L \times D_A^4)$.

In summary, the net cost after applying the two techniques in combination becomes $O(L \times H \times D_A^7)$. This still defines a large search space, but the complexity of the space is now polynomial in nature, rather than exponential. The search space can therefore be searched in polynomial time, which represents a feasible computing task.

In one approach, the exploration tool 1002 can combine the above two techniques together in the following manner. The exploration tool 1002 can first choose a combination of the parameters ($S_P$, $R_A$, $W_O$). For that combination, the exploration tool 1002 can then determine the composition of each layer of the DNN model 114, starting at layer z=1 and advancing to layer z=$z_L$, layer by layer. For each layer, the exploration tool 1002 can compute $T_{epoch}$ using Equation (16), with respect to each possible combination of partition number ($E_s$), number of threads ($M_z$), number of replicated layers ($R_z$), and segment-to-worker mapping (Segment-ToWorkerMap). The value of $T_{epoch}$ that has the smallest value, among the possible combinations, will determine $E_z$, $M_z$, and $R_z$ for that layer, together with the segment-to-worker mapping for that layer. In exploring the combinations for the layer z, the exploration tool 1002 relies on previous computations that have been made for previous layers in the DNN model 114. The exploration tool can then repeat the entire procedure described above for another combination of ($S_P$, $R_A$, $W_O$). When all combinations of ($S_P$, $R_A$, $W_O$) have been explored, the combination that yields the overall smallest $T_{epoch}$ value will also define the optimal composition of the DNN model 114, e.g., corresponding to at least the values ($S_P$, $R_A$, $W_O$, [$E_z$, $R_z$, $M_z$, Segment-ToWorkerMap]$_{PerLayerz}$).

The above-described complexity-reduction strategies are set forth in the spirit of illustration, not limitation. In other implementations, additional reduction techniques can be applied to further reduce the complexity of the search space. For example, the optimization tool 912 can also apply any type of branch-and-bound technique to prune (eliminate) paths in the search space that will not lead to better $T_{epoch}$ values compared to those values that have already been encountered in the course of a search for the optimal solution.

As a final comment, note that the developer may also manually specify constraints that reduce the complexity of the search space. For example, a developer may fix any subset of the full set of parameters which define a DPS solution. The optimization tool 912 then explores solutions within a correspondingly constrained search space, rather than searching the complete search space described above.

A.7. Illustrative User Experience

Figure 12:
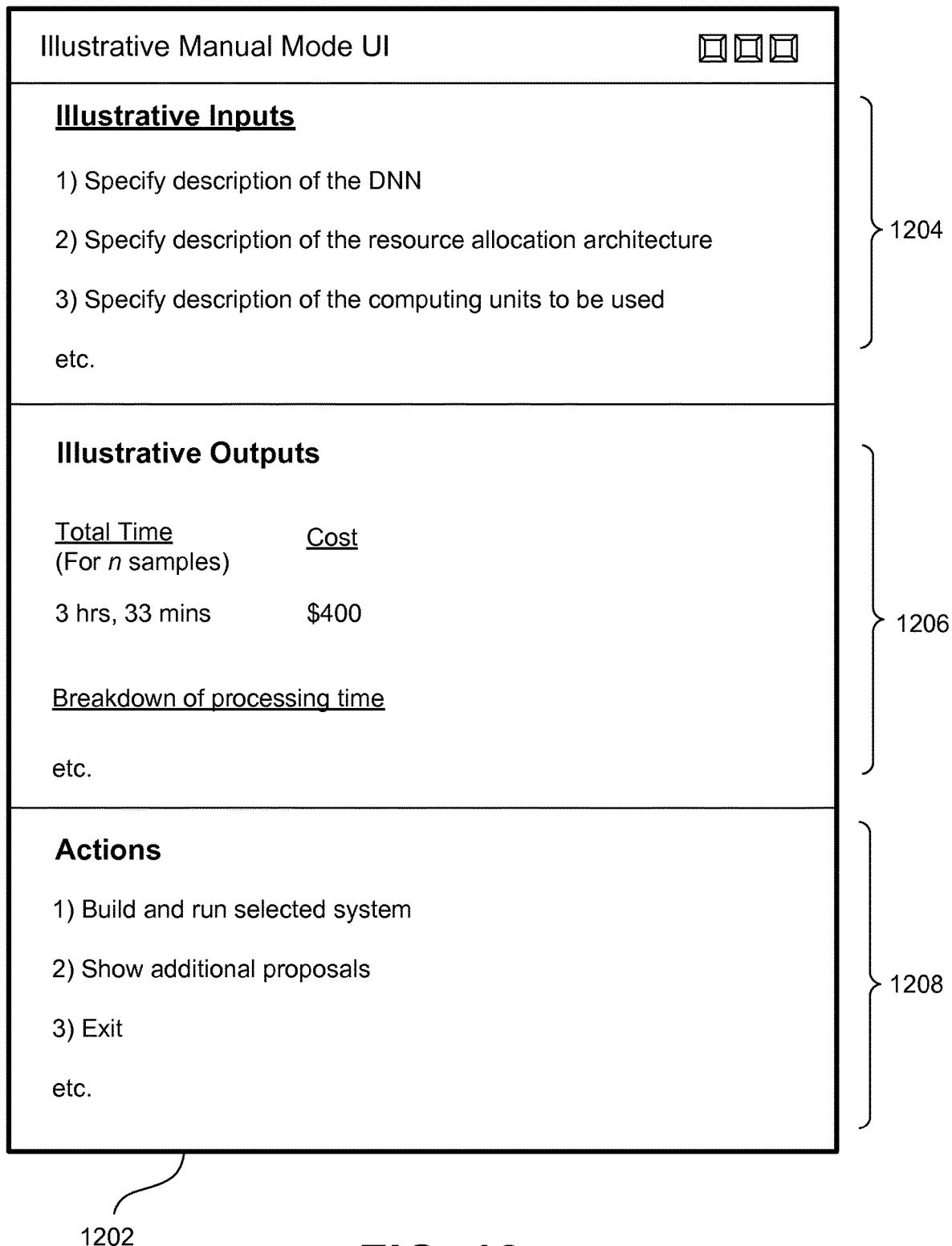
FIG. 12 shows an illustrative user interface presentation that may be produced by the PIT of FIG. 9, in a manual mode of operation.

Advancing to FIG. 12, this figure shows an illustrative user interface presentation 1202 that may be produced by the user interface module 916 of FIG. 9 in a manual mode of operation. More specifically, the user interface presentation 1202 is depicted in a high-level manner to describe the types of information items that may be conveyed and collected via the user interface module 916. Specific implementations of the user interface presentation 1202 can use different graphical interface components and techniques to convey and collect these information items; those particular implementations can have any visual appearance, behavior, etc.

An input section 1204 allows model developer (or other user) to specify one or more instances of input information. The input information may describe the type of graphical model (e.g., the type of DNN) that will be trained, the resource allocation architecture of the DPS that will perform the training, and the type of computing units 106 to be used in the DPS, and so on.

More specifically, a developer may manually specify each instance of input information using any input technique. For example, the user interface module 916 may allow the developer to input information via text entry boxes, menus, graphical slider mechanisms, graphical knob mechanisms, and so on. Alternatively, or in addition, the user interface module 916 may allow a developer to load a file which provides at least some of the input information. For example, such a file may include information that defines at least part of the structure and behavior of the DNN under consideration.

An output section 1206 describes the results of the analysis performed by the PIT 108. The output section 1206 can present the output results in any manner. In the non-limiting case of FIG. 12, the output section 1206 can display the $T_{epoch}$ time for the candidate DPS that the developer has described via the input section 1204.

The output section 1206 can also display a cost associated with the DPS solution. For example, in one context, a framework provider may use a remote system, having a plurality of computing resources, to host the PIT 108, and perhaps even the computing units 106 that are used to perform the actual training on the DPS. A developer may interact with such a remotely-implemented PIT 108 to explore different DPS solutions for use in training a DNN model. Upon choosing a particular DPS solution, the developer may then request the framework provider to build and run the DPS using its computing resources. In connection with the above-described scenario, the cost information shown in FIG. 12 refers to the cost associated with the proposed DPS solution. The cost may depend on any of: an amount of computing resources that will be deployed to perform the training; the type of the resources that will be deployed; the timing at which the resources will be deployed, and so on. In yet other cases, a developer may use the PIT 108 in a standalone private context, or a payment-free context, in which the cost information shown in FIG. 12 may be omitted.

The user interface module 916 can use other strategies to convey the time-based performance measures. For example, recall that that the PIT 108 determines the final $T_{epoch}$ measure by computing various component time measures that contribute to the $T_{epoch}$ measure. The user interface module 916 can provide a breakdown of these component time measures for any level of granularity. For instance, the user interface module 916 can provide a breakdown of time expenditures on a layer by layer basis, and/or on a task-related basis (e.g., by discriminating among computation, communication, and weight-updating tasks), and so on. The user interface module 916 can also identify and highlight component time expenditures that are considered high relative to some point of reference.

In other implementations, a developer may use the input section 1204 to manually describe plural candidate solutions. The output section 1206 can convey the $T_{epoch}$ times of the plural candidate solutions. More specifically, the output section 1206 can present these plural output results in any format, such as a table-based format, a chart-based format, a graph-based format, and so on.

In yet other implementations, the input section can include dynamic control mechanisms, such as graphical slider mechanisms, graphical knob mechanisms, etc. The different control mechanisms control the values of different input parameters, such as, in one case, the number of worker units per replica unit, etc. The output section 1206 can dynamically show the developer the outcome of the changes that he or she makes via the above-described types of control mechanisms, e.g., as the developer is making the changes.

The above-described input and output strategies are set forth in the spirit of illustration, not limitation. Other implementations can adopt yet other strategies.

An action section 1208 may allow a developer to take one or more actions after reviewing the output results in the output section 1206. For example, the developer may select a candidate DPS solution in the output section 1206, and then request the framework 102 to build the selected DPS. The developer may then apply the DPS to train a DNN. Alternatively, if the developer is not satisfied with the performance of the DPS solutions explored thus far, the developer may interact with the input section 1204 to manually specify one or more additional DPS solutions.

Figure 13:
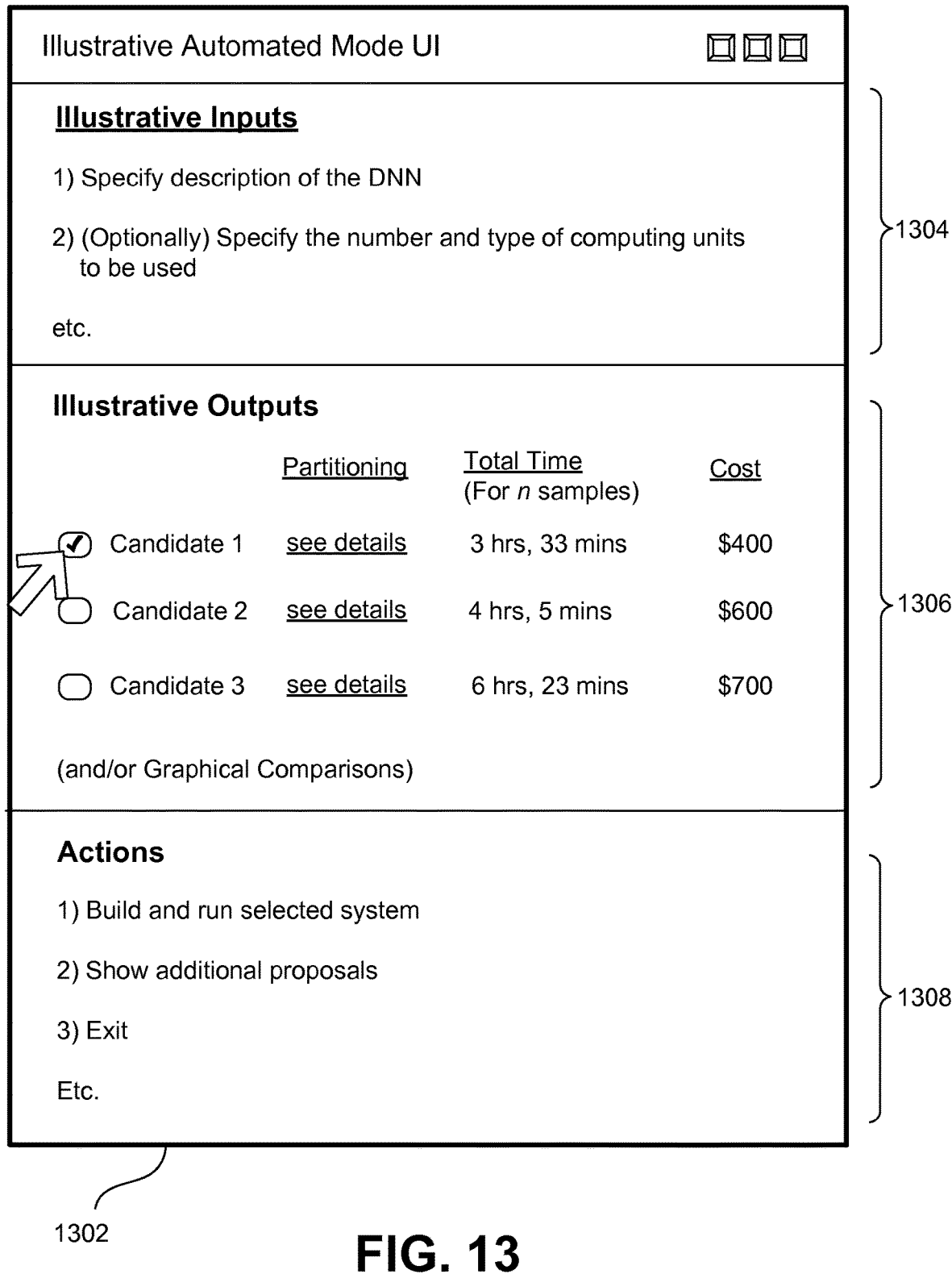
FIG. 13 shows an another illustrative user interface presentation that may be produced by the PIT of FIG. 9, in the automated mode of operation

FIG. 13 shows an illustrative user interface presentation 1302 that may be produced by the user interface module 916 of FIG. 9 in an automated mode of operation. Like the case of FIG. 12, the user interface presentation 1302 may include an input section 1304, an output section 1306, and an action section 1308.

In this case, however, the input section 1304 allows a developer to only partially define the DPS solution being sought, with respect to any degree of incompletion. For example, at one end of the design spectrum, the developer can fix all of the parameters, except for one parameter which is left unresolved. At the other end of the design spectrum, the developer can leave all parameter value undefined. The input section 1304 can use any of the above-described types of input mechanisms (explained in the context of FIG. 12) to receive the input information.

The optimization tool 912 works in conjunction with the time calculation engine 908 to generate one or more DPS solutions that offer acceptable $T_{epoch}$ times, as well as satisfy whatever constraints that the developer has supplied via the input section 1304. For example, in one case, the PIT 108 can automatically identify the DPS solution having the short $T_{epoch}$ time, or a set of n DPS solutions that have the shortest $T_{epoch}$ times. In other cases, the PIT 108 can present a set of options that are not necessarily the best from the standpoint of processing time, but are nonetheless considered desirable because they also satisfy other developer-specified goals. For example, the PIT 108 can generate the DPS solution that offers the best time-based performance for different cost brackets. Different cost brackets may entail the use of different amounts of processing resources, different types of processing resources, different delivery schedules of processing resources, and so on.

The output section 1306 can present its solutions in any manner described above, such as in a table-based format, a chart-based format, a graph-based format, and so on. The output section 1306 may also allow a developer to review the component processing times associated with any selected DPS solution.

A.8. Illustrative Modifications to DPSs

Figure 14:
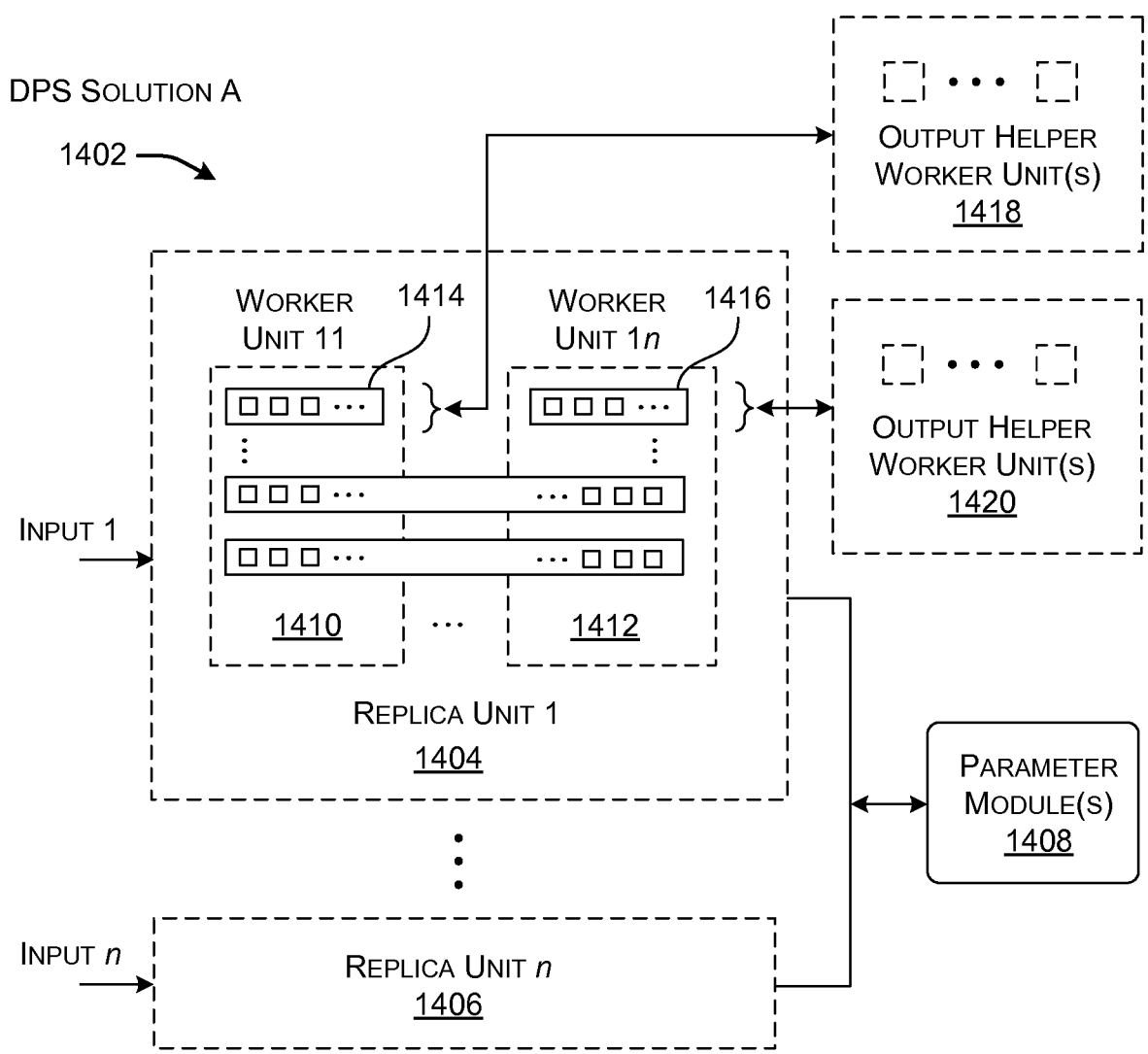
FIGS. 14 and 15 show two respective distributed processing systems that may be produced, based on insight gleaned from the framework of FIG. 1.
Figure 15:
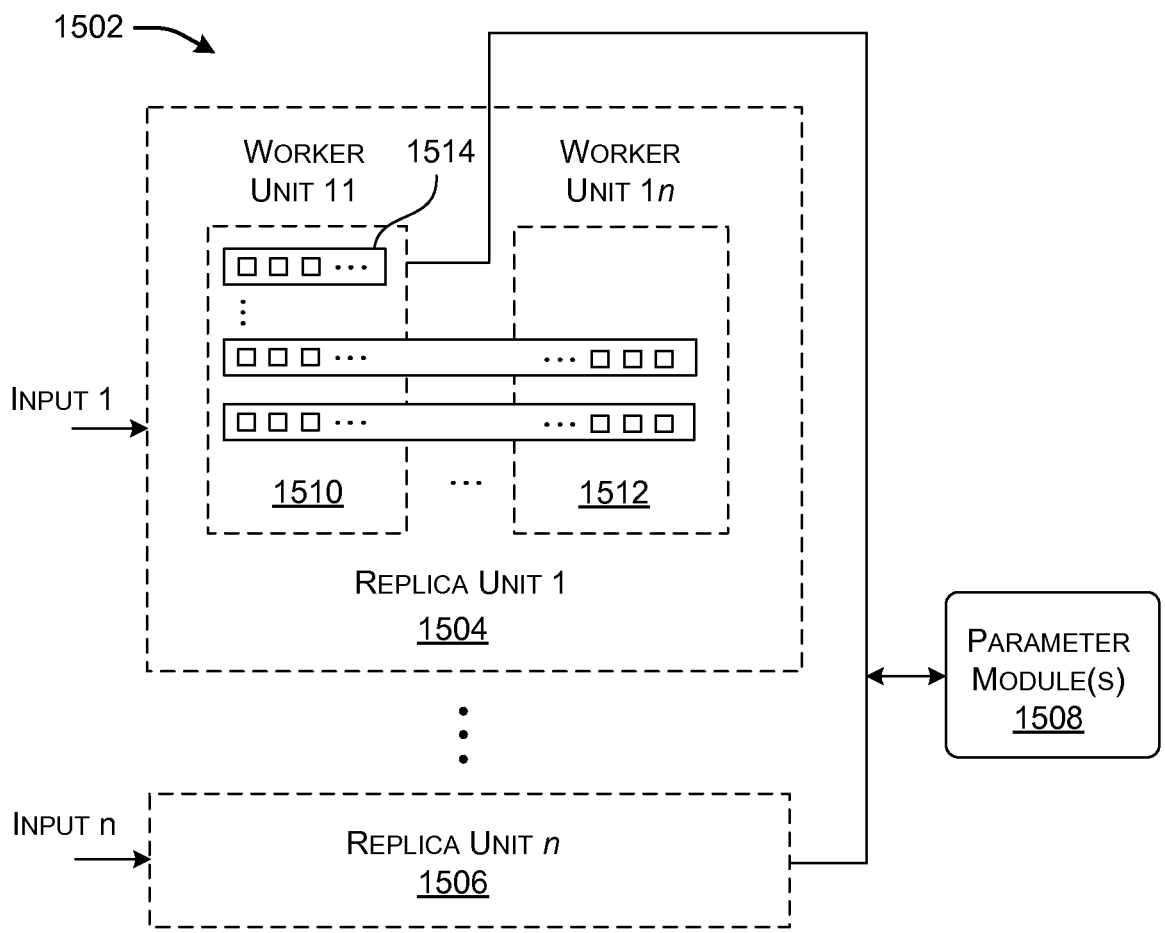

FIGS. 14 and 15 show two respective distributed processing systems (DPSs) (1402, 1502) that may be produced as a result of analysis performed by the PIT 108. Referring first to FIG. 14, the DPS 1402 in this example includes one or more replica units (e.g., replica unit 1404, replica unit 1406, etc.), which exchange weight information with at least one parameter module 1408. Each replica unit operates on a different replica-specific input data set.

Each replica unit further hosts at least one worker unit. For example, FIG. 14 indicates that the replica unit 1404 includes at least a worker unit 1410 and a worker unit 1412. More specifically, each replica unit divides the layers of the DNN among its worker units according to any partitioning strategy, except with respect to the output layer. For the output layer, each worker unit, or at least one worker unit, may host the entire output layer, not a partition of it. FIG. 14, for instance, shows that the worker unit 1410 provides a complete output layer 1414, while the worker unit 1412 provides another complete output layer 1416.

The PIT 108, when applied to above-described design (and without yet considering the improvement to be described below), may reveal that the use of a full output layer in each worker unit operates as a bottleneck which slows down the training of the DNN. More specifically, without the below-described modification, the design shown in FIG. 14 requires each worker unit to perform a large amount of computations and communications when handling the output layer. Such computations may entail receiving input activations from other worker units (for use in computing the output activations in the output layer), computing the output activations, generating error values for the output layer, updating weights for the output layer, etc.

The DPS 1402 of FIG. 14 also represents a solution which alleviates at least some of the processing load described above. In particular, the DPS 1402 allocates one or more additional helper worker units to each existing worker unit. The existing worker unit that receives help is referred to as a helpee worker unit. For example, the DPS 1402 allocates one or more helper units 1418 to the helpee worker unit 1410, and one or more helper units 1420 to the helpee worker unit 1412. Each set of helper worker units assists its helpee worker unit in performing some of the tasks involved in processing the output layer. In other words, the helper worker units operate in parallel with their helpee worker unit to expedite the data intensive nature of the processing associated with the output layer of the helpee worker unit. Introducing the use of helper units shortens the overall training time that is projected to be required to train the entire DNN.

In one implementation, the DPS 1402 implements the helper worker units as new dedicated worker units, e.g., which perform no other functions other than their roles in assisting their respective helpee worker units. In other cases, the DPS 1402 can identify underutilized worker units that have already been assigned roles within the DPS 1402. For example, a worker unit may have spare computing cycles when it is waiting for activations from another worker unit. The DPS 1402 leverages the unused capacity of these existing worker units by instructing these existing workers to perform the role of helpee worker units, when they have free computing cycles to do so.

Advancing to FIG. 15, the DPS 1502 shown there also includes any number of replica units (e.g., replica units 1504, 1506, etc.) for operating on replica-specific input data sets, and for exchanging weight information with a parameter module 1508. Each replica unit includes one or more worker units. For example, the replica unit 1504 includes at least worker unit 1510 and worker unit 1512.

Like the case in FIG. 14, each replica unit in FIG. 15 distributes the DNN model across its worker units, with respect to all layers of the DNN except the output layer. For example, FIG. 15 shows that the worker unit 1510 includes a full output layer 1514. But unlike the case of FIG. 14, the replica unit 1504 includes at least one worker unit that does not include any output layer. For example, the worker unit 1512 does not include any output layer; rather, the worker unit 1512 utilizes the full output layer of the worker unit

1510. A worker unit that includes a full output layer is referred to herein as a parameter-interaction worker unit, while a worker unit that lacks such an output layer is referred to as a non-interaction worker unit. Other replica units have a similar configuration to that shown for the replica unit 1504.

Among other tasks, a parameter-interaction worker unit performs the task of calculating and sending delta weight updates to the parameter module 1508 with respect to all layers (including its output layer), and the task of receiving full weight updates from the parameter module 1508 (again with respect to all layers, including the output layer). A non-interaction worker unit does not perform these functions with respect to an output layer, since it has no output layer.

The architecture shown in FIG. 15 reduces the amount of weight information that is exchanged between the parameter module 1508 and the replica units (1504, 1506), e.g., by reducing the amount of processing associated with non-partitioned output layers within a replica unit. As a further result, the DPS 1502 of FIG. 15 may have the net effect of reducing the delays associated with the exchange of weight information. Note that, by serializing the computation of the output layer delta weights to fewer worker units, an entire replica unit may be made slower, as its worker units wait longer to receive activations for backward propagation; but this cost does not outweigh the benefits described above, for certain DPS implementations.

The above-described improvement (that is, the improvement of reducing the number of output layers in replica units) may also ensue from insight gained through the use of the PIT 108. That is, the user may first use the PIT 108 to analyze a DPS solution in which all of the worker units in a replica unit host full output layers. Through interaction with the PIT 108, the user may gain insight regarding the communication-related bottleneck that this design causes. As a result, the user may decide to reduce the number of worker units that host a full output layer, that is, to produce the DPS design of FIG. 15.

B. Illustrative Processes

FIGS. 16-19 explain the operation of the framework 102 of Section A in flowchart form. Since the principles underlying the operation of the framework 102 have already been described in Section A, certain operations will be addressed in summary fashion in this section.

Figure 16:
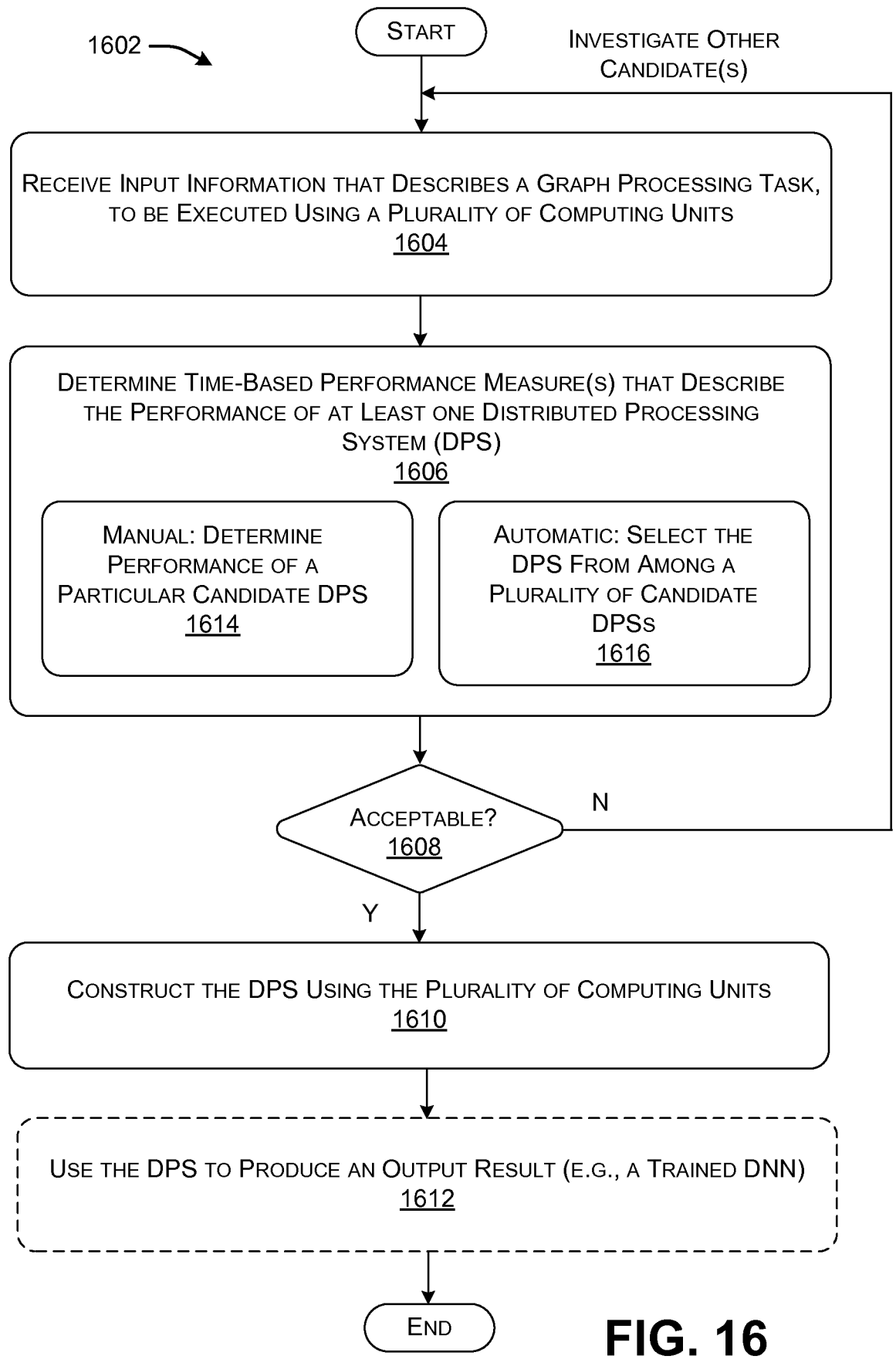
FIG. 16 shows a process that represents an overview of one manner of operation of the framework of FIG. 1.

Starting with FIG. 16, this figure shows a process 1602 that represents an overview of one manner of operation of the framework 102 of FIG. 1. In block 1604, the PIT 108 receives input information which describes at least some characteristics of a graph processing task to be executed in a distributed manner using a plurality of computing units 106. As in the principal example of Section A, the graph processing task may entail using a DPS to train a Deep Neural Network (DNN) model. In block 1606, the PIT 108 determines, based on the input information, at least one time-based performance measure that describes a prospective performance of at least one DPS that is capable of performing the graph processing task.

In block 1608, a decision is made regarding whether the DPS identified in block 1606 is satisfactory, based on any metric(s) of satisfaction. For example, a user may manually make the evaluation associated with block 1608. Or the PIT 108 may automatically make the evaluation of block 1608. If the evaluated DPS is deemed satisfactory, the processing flow continues to block 1610. Otherwise, the processing flow returns to block 1604, where the user may modify the input information, which may have the effect of identifying one or more other evaluated DPSs.

In some cases, the performance information conveyed by the PIT 108 may reveal one or more bottlenecks in a current DPS design under consideration. The user (and/or the PIT 108) may leverage this insight by changing the part of the DPS under consideration which is believed to be causing the bottleneck(s). In other words, block 1608 may entail identifying at least one aspect of a DPS under consideration that can be modified to improve its performance. For instance, FIGS. 14 and 15 represent two illustrative modifications that are produced based on insight gained from using the PIT 108.

In block 1610, the configuration system 110 builds the DPS that has been selected. Building the DPS may entail allocating a prescribed number of computing units, connecting the computing units together in a specified manner (based on the resource allocation architecture being used), loading or activating appropriate code on the computing units, and so on. The optional block 1612 entails using the configured DPS to perform the graph processing task, e.g., by using the DPS to train a DNN.

The modeling operation performed in block 1606 can be performed in manual manner or an automated manner. In the manual mode, the input information collected in block 1604 describes a particular DPS under consideration. Block 1606 then entails determining at least one time-based performance measure of that particular candidate DPS. In the automated mode, the input information collected in block 1604 constitutes at least one constraint that the evaluated DPS is expected to satisfy. Block 1606 then entails automatically determining the evaluated DPS from among a plurality of DPS candidate systems.

Figure 17:
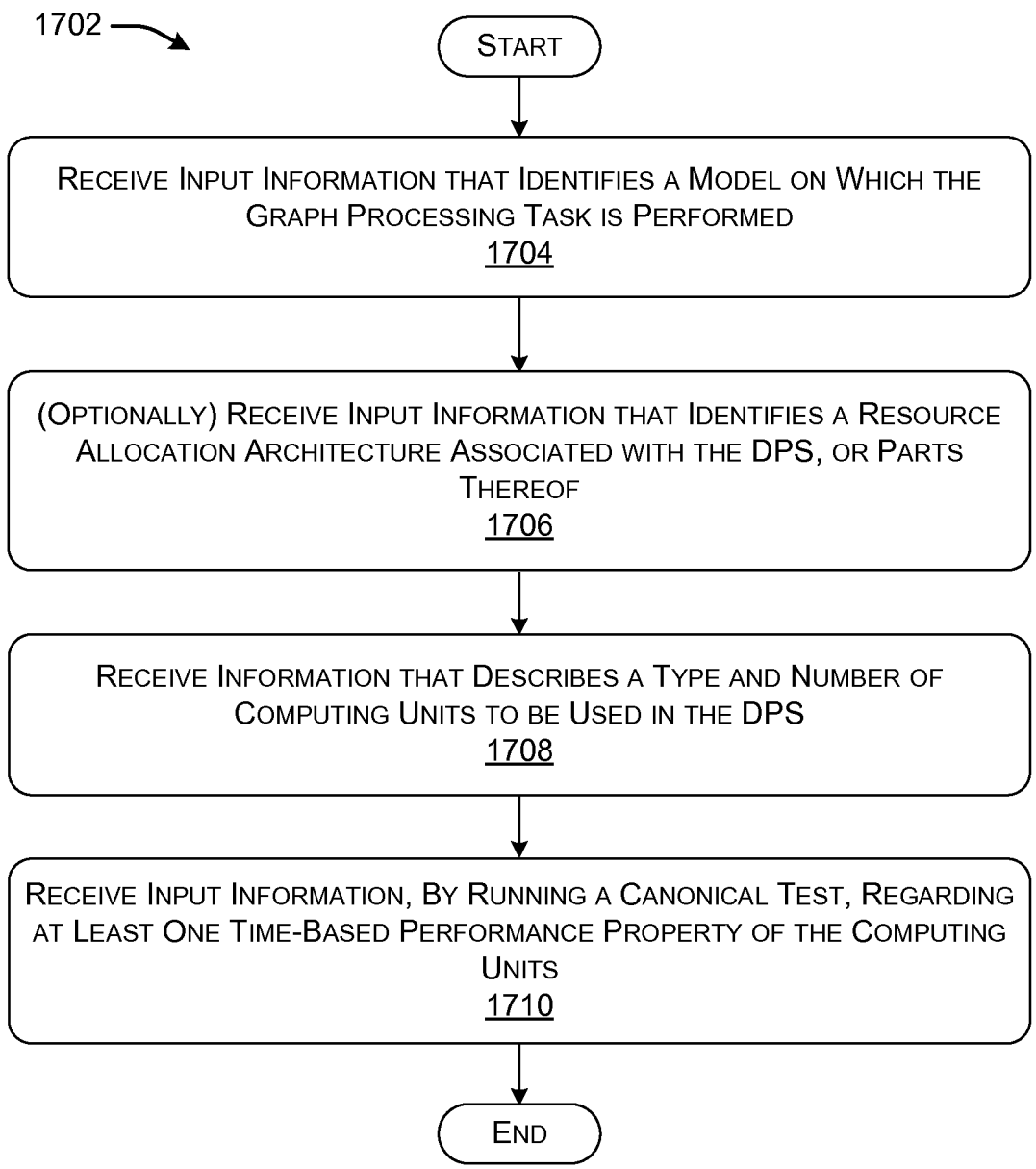
FIG. 17 shows a process that describes one manner of collecting input information; that process, in turn, corresponds to one operation within the overview process of FIG. 16.

FIG. 17 shows a process 1702 that describes one manner by which the PIT 108, in its manual mode of operation, may collect instances of input information, corresponding to block 1604 of FIG. 16. When operating in the automated mode, the PIT 108 may omit one or more of the operations shown in FIG. 17.

In block 1704, the PIT 108 receives input information that describes the nature of the graphical model under consideration, such as the DNN model under consideration. For example, block 1704 may entail receiving information that describes the number of layers in the DNN model, the connections among neurons in the DNN model, and so on. In block 1706, the PIT 108 receives input information that describes the resource allocation architecture to be used by the candidate DPS under consideration. For instance, block 1706 may entail receiving information regarding the number of replica units in the DPS, the number of worker units in each replica unit, and so on. In block 1708, the PIT 108 receives input information which describes the type of computing units 106 to be used in the candidate DPS. For instance, block 1708 may entail receiving information which describes type of processing architecture that is employed by the computing units.

In block 1710, the PIT 108 receives input information regarding at least one time-based performance property of the selected computing units 106. More specifically, the PIT 108 may perform block 1710 by running one or more canonical tests on the actual computing units 106; those tests are designed to mimic the nature of certain parts of the training operation, but without actually performing any training at this stage.

Figure 18:
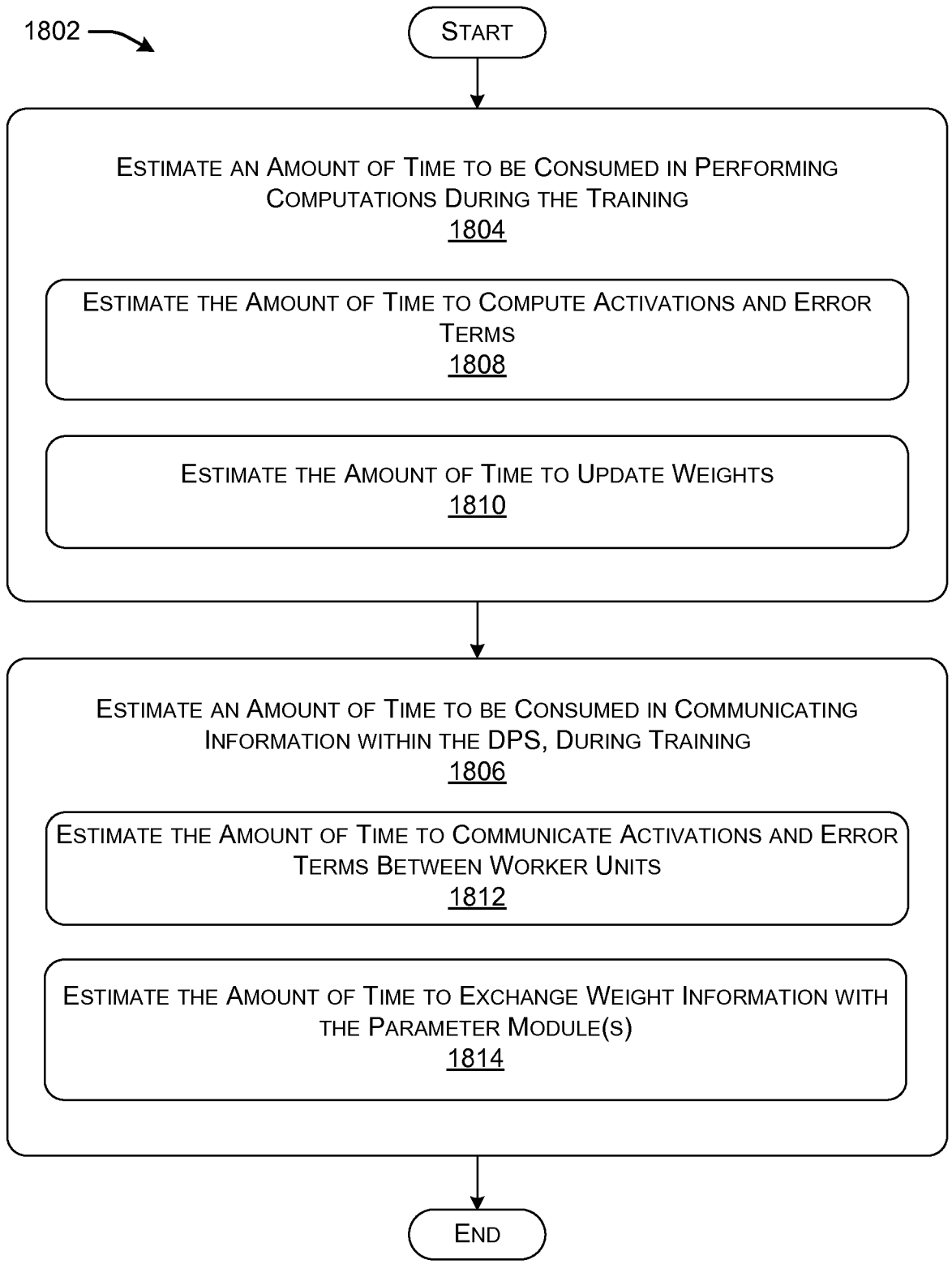
FIG. 18 shows a process that describes one manner of assessing the performance of a candidate distributed processing system; that process, in turn, corresponds to another operation within the overview process of FIG. 16.

FIG. 18 shows a process 1802 that describes one manner by which the PIT 108 can generate one or more time-based performance measures, e.g., using the equations set forth in Subsection A.5 above. In block 1804, the PIT 108 estimates an amount of time that is required to perform all computation-related aspects of the training, on a per-level basis. In block 1806, the PIT 108 estimates the amount of time that is required to perform all communication-related aspects of the training, on a per-level basis. The total amount of time that is required to perform the training corresponds to the sum of the times computed in block 1804 and 1806.

More specifically, the estimation of the computation-related time (in block 1804) may include at least two determinations. In block 1808, the PIT 108 may estimate an amount of time that is required to compute activations in the forward and backward directions of training, on a per-level basis. In block 1810, the PIT 108 may estimate the amount of time that is required to update the weights on per-level basis.

The estimation of the communication-related time (in block 1806) likewise has at least two determinations. In block 1812, the PIT 108 estimates an amount of time that will be involved in communicating activations between worker units, on a per-level basis. In block 1814, the PIT 108 estimates an amount of time that will be involved in the exchange of weight information between the worker units and the parameter module 810, on a per-level basis.

Figure 19:
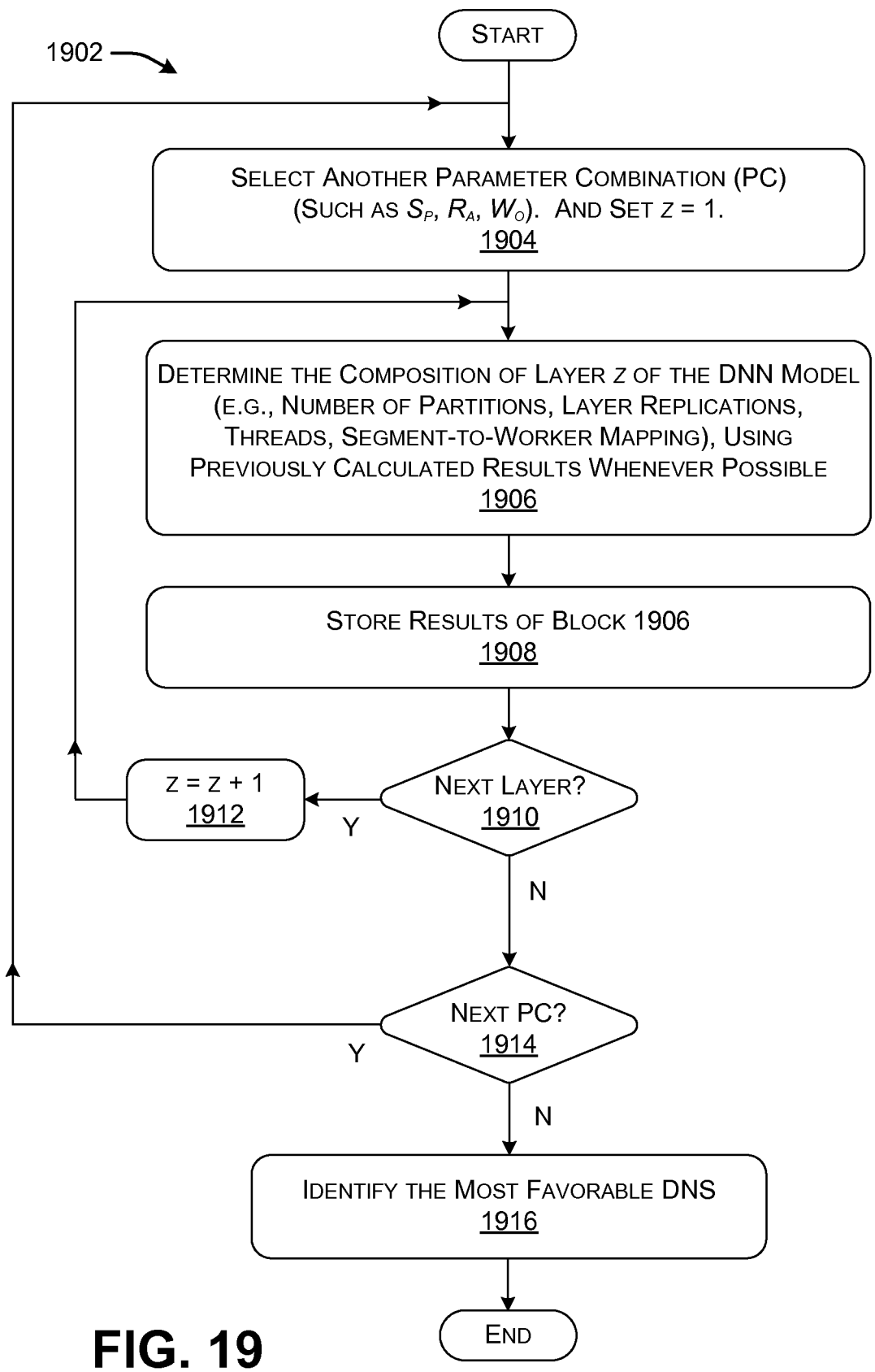
FIG. 19 shows a process for finding an optimal solution within a search space that defines a collection of candidate distributed processing system solutions.

FIG. 19 shows a process 1902 that describes one manner of operation of the optimization tool 912 of the PIT 108. In block 1904, the optimization tool 912 may define an initial combination of parameters, such as a parameter $S_P$ which defines the number of parameter modules to be used in a DPS solution, a parameter $R_A$ which specifies the number of replica units to the be used in the DPS solution, and a parameter $W_O$ which determines the number of worker units to be used in each replica unit. Further, block 1904 sets a layer index z to an initial value of 1.

In block 1906, the optimization tool 912 uses the two techniques described in Subsection A.6 to determine the combination of layer z (which is initially set to the first layer, as per block 1904). In particular, the two techniques, when applied in combination, determine the combination of configuration variables that yields the smallest $T_{epoch}$ value. Those variables include the number of partitions ($E_z$) in the layer z, the number of layer replications ($R_z$) for layer z, the number of threads ($M_z$) devoted to layer z, and the segment-to-worker mapping (SegmentToWorkerMap) for layer z. The dynamic programming technique described in Subsection A.6 may entail using previously stored results provided in the data store 1004 whenever possible, e.g., produced in the course of processing previous layers. In block 1908, the optimization tool 912 stores the results of the analysis performed in block 1906 in the data store 1004.

In blocks 1910 and 1912, the optimization tool 912 advances to the next layer (e.g., z+1) in the DNN model 114, and then repeats the inner loop of the process 1902. But if the current layer z corresponds to the output layer (L), then the optimization tool 912 advances to block 1914, which determines whether there is another combination of parameters (e.g., $S_P$, $R_A$, $W_O$) to consider. If so, then the optimization tool 912 repeats the above-described analysis with respect to the new combination of parameters. If not, in block 1916, the optimization tool outputs its final analysis. That final analysis may identify one or more DPS solutions having the shortest $T_{epoch}$ times.

Overall, the process 1902 corresponds to just one of many ways of investigating a search space in an efficient manner. For example, in another approach, the optimization tool 912 can consider different parameter combinations (e.g., $S_P$, $R_A$, $W_O$) as part of the analysis performed in the inner loop of the process 1902.

To summarize the explanations in Sections A and B, according to a first aspect, a method is provided for investigating a performance of a distributed processing system and then building the distributed processing system. The method may include the operations of: receiving, via a computer-implemented performance investigation tool (PIT), input information that describes at least some characteristics of a graph processing task to be executed in a distributed manner using a plurality of computing units; and determining, based on the input information, and using the computer-implemented PIT, at least one time-based performance measure that describes a prospective performance of a distributed processing system that is capable of performing the graph processing task using the plurality of computing units. The method may also optionally include the operation of constructing the distributed processing system using the plurality of computing units.

According to a second aspect, which can be combined with any other aspect(s) set forth herein, the above-referenced graph processing task includes training a deep neural network model having a plurality of layers.

According to a third aspect, which can be combined with any other aspect(s) set forth herein, the method may accommodate a manual mode of operation. In that mode, the input information describes a particular candidate distributed processing system under consideration. Further, the determining operation includes determining the above-mentioned at least one time-based performance measure of the particular candidate distributed processing system.

According to a fourth aspect, which can be combined with any other aspect(s) set forth herein, the method may also accommodate an automated mode of operation. In that mode, the input information describes at least one constraint that the distributed processing system is expected to satisfy. Further, the determining operation includes automatically determining the distributed processing system from among a plurality of candidate distributed candidate systems.

According to a fifth aspect, which can be combined with any other aspect(s) set forth herein, in the automated mode of operation, the determining operation entails using a dynamic programming technique to find an optimal distributed processing system.

According to a sixth aspect, which can be combined with any other aspect(s) set forth herein, in the automated mode of operation (and for the case in which the graph processing task includes training a deep neural network model having a plurality of layers), the determining operation entails at least investigating: a number of partitions to be used in each layer of the deep neural network, and an allocation of worker units to the partitions in each layer, in a successive layer-by-layer manner.

According to a seventh aspect, which can be combined with any other aspect(s) set forth herein, in the automated mode of operation, a complexity of the determining operation is polynomial (e.g., rather than exponential).

According to an eighth aspect, which can be combined with any other aspect(s) set forth herein, the of operation of receiving the input information includes executing a test on the computing units to identify at least one time-based performance property of the computing units.

According to a ninth aspect, which can be combined with any other aspect(s) set forth herein, the graph processing task includes training a deep neural network model having a plurality of layers, and having a plurality of neurons in each layer, using the plurality of computing units. The determining operation further entails: estimating an amount of time to be consumed in performing computations entailed by the training; and estimating an amount of time to be consumed in communicating information within the distributed processing system, in performing the training.

According to a tenth aspect, which can be combined with any other aspect(s) set forth herein, the operation of estimating of the amount of time to be consumed in performing computations includes: estimating an amount of time to be consumed in generating activations and error terms, for each layer of the deep neural network model; and estimating an amount of time to be consumed in updating weights, for each layer of the deep neural network model.

According to an eleventh aspect, which can be combined with any other aspect(s) set forth herein, the operation of estimating of the amount of time to be consumed in communicating information includes: estimating an amount of time, for each layer of the deep neural network model, to be consumed in communicating activations and error terms between computing units; and estimating an amount of time to be consumed in exchanging weight information with at least one parameter module.

According to a twelfth aspect, which can be combined with any other aspect(s) set forth herein, the method further includes: based on the above-mentioned at least one time-based performance measure, identifying at least one modification that can be made to the distributed processing system to improve performance of the distributed processing system; and making the modification to produce a modified distributed processing system.

According to a thirteenth aspect, which can be combined with any other aspect(s) set forth herein, again assume that the graph processing task entails training a deep neural network model having a plurality of layers. The modified distributed processing system includes at least one replica unit, each for operating on a replica-specific data set, each having at least one worker unit. Each worker unit implements a portion of the deep neural network model. The modified distributed processing system further includes at least one parameter module, each for exchanging weight information with the replica unit(s). The modified distributed processing system further includes at least one helper worker unit which is configured to assist at least one helpee worker unit in performing tasks associated with an output layer of the deep neural network model.

According to a fourteenth aspect, which can be combined with any other aspect(s) set forth herein, the modified distributed processing system again includes at least one replica unit, each for operating on a replica-specific data set. The modified distributed processing system also includes at least one parameter module, each for exchanging weight information with the above-mentioned at least one replica unit. Each replica unit includes: at least one parameter-interaction worker unit, each of which implements a portion of the deep neural network model, and each of which is configured to exchange weight information with the above-mentioned at least one parameter module; and at least one non-interaction worker unit, each of which implements a portion of the deep neural network model, and each of which is not configured to exchange weight information with the above-mentioned at least one parameter module.

According to a fifteenth aspect, which can be combined with any other aspect(s) set forth herein, each replica unit (with respect to the fourteenth aspect) has a single parameter-interaction worker unit.

According to a sixteenth aspect, a method may be provided that includes any permutation of the first through fifteenth aspects.

According to a seventeenth aspect, one or more computing devices may be provided for implementing any permutation of the first through sixteenth aspects, using respective components.

According to an eighteenth aspect, one or more computing devices may be provided for implementing any permutation of the first through sixteenth aspects, using respective means.

According to a nineteenth aspect, a computer readable medium may be provided for implementing any permutation of the first through sixteenth aspects, using respective logic elements.

According to a twentieth aspect, which can be combined with any other aspect(s) set forth herein, one or more computing devices for implementing at least a portion of a performance investigation framework are provided. The computer device(s) includes a performance investigation tool (PIT), which, in turn, may include an input providing module configured to receive input information that describes at least some aspects of a graph processing task to be executed in a distributed manner using a plurality of computing units; a performance investigation module configured to determine, based on the input information, at least one time-based performance measure that describes a prospective performance of a distributed processing system that is capable of performing the graph processing task using the plurality of computing units; and an output generating module configured to formulate an output which conveys the above-mentioned at least one time-based performance measure.

According to twenty-first aspect, which can be combined with any other aspect(s) set forth herein, in a manual mode of operation, the input information describes a particular candidate distributed processing system under consideration, and the performance investigation module is configured to determine the above-mentioned at least one time-based performance measure of the particular candidate distributed processing system.

According to a twenty-second aspect, which can be combined with any other aspect(s) set forth herein, in an automated mode of operation, the input information describes at least one constraint that the distributed processing system is expected to satisfy, and the performance investigation module is configured to automatically determine the distributed processing system from among a plurality of candidate distributed candidate systems.

According to a twenty-third aspect, which can be combined with any other aspect(s) set forth herein, a configuration system is further provided that is configured to construct the distributed processing system (specified by the PIT), using the plurality of computing units, based on system configuration information provided by the PIT.

According to a twenty-fourth aspect, which can be combined with any other aspect(s) set forth herein, a computer readable storage medium for storing computer readable instructions is provided; the computer readable instructions implement a performance investigation tool (PIT) when executed by one or more processing devices. The computer readable instructions, in turn, include: logic configured to receive input information that describes at least some aspects of a graphical task of training of a deep neural network model having a plurality of layers, to be executed using a plurality of computing units; and logic configured to determine, based on the input information, at least one time-based performance measure that describes performance of a distributed processing system that is capable of performing the graphical task using the plurality of computing units. The time-based performance measure(s) is based on, for each layer of the deep neural network model, at least: an estimated amount of time to be consumed in performing computations entailed by the training; and an estimated amount of time to be consumed in communicating information within the distributed processing system, in performing the training.

C. Representative Computing Functionality

FIG. 20 shows computing functionality 2002 that can be used to implement any aspect of the framework 102 set forth in the above-described figures. For instance, the type of computing functionality 2002 shown in FIG. 20 can be used to implement any of: the PIT 108, the configuration system 110, the distributed processing system (DPS) 104, an individual computing unit, a user device, and so on. In all cases, the computing functionality 2002 represents one or more physical and tangible processing mechanisms.

The computing functionality 2002 can include one or more processing devices 2004, such as one or more central processing units (CPUs), and/or one or more graphics processing units (GPUs), and so on.

The computing functionality 2002 can also include any storage resources 2006 for storing any kind of information, such as code, settings, data, etc. Without limitation, for instance, the storage resources 2006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2002. The computing functionality 2002 may perform any of the functions described above when the processing devices 2004 carry out instructions stored in any storage resource or combination of storage resources.

As to terminology, any of the storage resources 2006, or any combination of the storage resources 2006, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2002 also includes one or more drive mechanisms 2008 for interacting with any storage resource, such as a hard disk drive mechanism, an optical disk drive mechanism, and so on.

The computing functionality 2002 also includes an input/output module 2010 for receiving various inputs (via input devices 2012), and for providing various outputs (via output devices 2014). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 2016 and an associated graphical user interface (GUI) 2018. Other output devices include a printer, a model-generating mechanism, a tactile output mechanism, an archival mechanism (for storing output information), and so on. The computing functionality 2002 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), point-to-point connections, etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving input information that describes at least some characteristics of a graph processing task to be executed in a distributed manner by a particular distributed processing system using a plurality of computing units and at least one constraint the particular distributed processing system is expected to satisfy, the graph processing task comprising training a deep neural network model having a plurality of layers;
prior to constructing the particular distributed processing system to perform the graph processing task:
determining, using the input information, time-based performance measures for a plurality of candidate distributed processing systems, the time-based performance measures indicating a prospective performance of the particular distributed processing system when performing the graph processing task using the plurality of computing units; and
selecting the particular distributed processing system that satisfies the at least one constraint from the plurality of candidate distributed processing systems based at least on the determined time-based performance measures; and
after selecting the particular distributed processing system, constructing the particular distributed processing system using the plurality of computing units,
wherein the determining comprises assigning a partition in a particular layer to a particular computing unit based at least on a number of remote connections that the particular computing unit has to other computing units in a successive layer-by-layer manner.

2. The method of claim 1, wherein the input information describes the particular distributed processing system.

3. The method of claim 1, wherein the determining operates by using a dynamic programming technique to find an optimal solution that corresponds to the particular distributed processing system.

4. The method of claim 1, wherein the determining comprises at least investigating different numbers of partitions to be used in each layer of the deep neural network model by the plurality of candidate distributed processing systems, and different allocations of the plurality of computing units to the partitions in each layer, in a successive layer-by-layer manner.

5. The method of claim 1, wherein a complexity of the determining the time-based performance measures for the plurality of candidate distributed processing systems is polynomial.

6. The method of claim 1, wherein said receiving of the input information includes executing a test on at least one of the computing units to identify at least one time-based performance property without actually performing the graph processing task.

7. The method of claim 1, wherein the determining comprises:
predicting an amount of time to be consumed in performing computations entailed by the training; and
predicting an amount of time to be consumed in communicating information within a particular candidate distributed processing system, in performing the training.

8. The method of claim 7, wherein said predicting of the amount of time to be consumed in performing the computations comprises:
predicting an amount of time to be consumed in generating activations and error terms, for each layer of the deep neural network model; and
predicting an amount of time to be consumed in updating weights, for each layer of the deep neural network model.

9. The method of claim 7, wherein said predicting of the amount of time to be consumed in communicating information comprises:
predicting an amount of time, for each layer of the deep neural network model, to be consumed in communicating activations and error terms between computing units; and
predicting an amount of time to be consumed in exchanging weight information with at least one parameter module.

10. The method of claim 1, further comprising:
based at least on a particular time-based performance measure for a particular candidate distributed processing system, identifying at least one modification to the particular candidate distributed processing system to improve performance of the particular candidate distributed processing system; and
making the modification to produce a modified candidate distributed processing system.

11. The method of claim 10,
wherein the modified candidate distributed processing system includes:
at least one replica unit configured to operate on a replica-specific data set using at least one worker computing unit that implements a portion of the deep neural network model; and
at least one parameter module configured to exchange weight information with the at least one replica unit, and
wherein the modified candidate distributed processing system further comprises at least one helper worker computing unit configured to assist at least one helpee worker computing unit in performing tasks associated with an output layer of the deep neural network model.

12. The method of claim 10,
wherein the modified candidate distributed processing system includes:
replica units configured to operate on respective replica-specific data sets; and
parameter modules configured to exchange weight information with the replica units,
wherein each replica unit comprises:
at least one parameter-interaction worker computing unit configured to implement a portion of the deep neural network model and exchange weight information with at least one parameter module; and
at least one non-interaction worker computing unit configured to implement a portion of the deep neural network model without exchanging weight information with the parameter modules.

13. The method of claim 12, wherein each replica unit has a single parameter-interaction worker computing unit.

14. The method of claim 1, wherein the determining comprises:
in a successive layer-by-layer manner, choosing a number of partitions for a particular layer based at least on analysis results associated with a previous layer.

15. The method of claim 1, wherein the time-based performance measures are determined for less than all permutations of parameters associated with the plurality of candidate distributed processing systems.

16. The method of claim 1, further comprising:
presenting the particular distributed processing system to a user; and
receiving a selection input from the user,
wherein the constructing is performed after receiving the selection input.

17. One or more computing devices comprising:
a processing device; and
a computer-readable storage medium storing instructions which, when executed by the processing device, cause the processing device to:
receive input information that describes at least some aspects of a graph processing task to be executed in a distributed manner using a plurality of computing units, the graph processing task comprising training a neural network model having a plurality of layers;
based at least on the input information, determine time-based performance measures for a plurality of candidate distributed processing systems, the time-based performance measures describing a prospective performance of a particular distributed processing system that is capable of performing the graph processing task using the plurality of computing units, a partition in a particular layer being assigned to a particular computing unit based at least on a number of remote connections that the particular computing unit has to other computing units in a successive layer-by-layer manner;
formulate an output which conveys at least one of the time-based performance measures; and
construct the particular distributed processing system from among the plurality of candidate distributed processing systems by loading or activating code on the plurality of computing units.

18. The one or more computing devices of claim 17, wherein the input information describes the particular distributed processing system.

19. The one or more computing devices of claim 17, wherein the instructions, when executed by the processing device, cause the processing device to:
select the particular distributed processing system from among the plurality of candidate distributed processing systems that meet a constraint specified by the input information.

20. A computer readable storage medium storing computer readable instructions executable by one or more processing devices, the computer readable instructions comprising:
- logic configured to receive input information that describes at least some aspects of a graphical task of training of a deep neural network model having a plurality of layers, to be executed using a plurality of computing units;
- logic configured to determine, based at least on the input information, time-based performance measures for a plurality of candidate distributed processing systems, the time-based performance measures describing prospective performance of a particular distributed processing system that is capable of performing the graphical task using the plurality of computing units;
- logic configured to assign a partition in a particular layer to a particular computing unit based at least on a number of remote connections the particular computing unit has to other computing units in a successive layer-by-layer manner, a particular time-based performance measure being based on at least:
  - a predicted amount of time to be consumed in performing computations entailed by the training; and
  - a predicted amount of time to be consumed in communicating information within a particular candidate distributed processing system, in performing the training; and
- logic configured to construct the particular candidate distributed processing system using the plurality of computing units.

* * * * *